United States Patent
Mondri et al.

(10) Patent No.: US 11,249,627 B2
(45) Date of Patent: *Feb. 15, 2022

(54) DYNAMIC WHITEBOARD REGIONS

(71) Applicant: Microsoft Technology Licensing, LLC, Redmond, WA (US)

(72) Inventors: Ron Mondri, Bellevue, WA (US); Itai Almog, Redmond, WA (US); Francois M. Rouaix, Issaquah, WA (US); Christian James Colando, Seattle, WA (US); March Rogers, Dublin (IE); Eduardo Sonnino, Seattle, WA (US); Clea Allington, Seattle, WA (US); Palmer H. Batt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,580

(22) Filed: Apr. 8, 2019

(65) Prior Publication Data
US 2020/0319777 A1    Oct. 8, 2020

(51) Int. Cl.
G06F 3/048        (2013.01)
G06F 3/04845    (2022.01)
G06F 3/0482     (2013.01)

(52) U.S. Cl.
CPC ........ *G06F 3/04845* (2013.01); *G06F 3/0482* (2013.01); *G06F 2203/04803* (2013.01)

(58) Field of Classification Search
CPC .............................. G06F 3/0416; G06F 3/046
See application file for complete search history.

(56) References Cited

U.S. PATENT DOCUMENTS 5,835,898 A    11/1998    Borg et al.
6,057,834 A      5/2000    Pickover
(Continued)

OTHER PUBLICATIONS

Brown et al., The Whiteboard Environment: An Electronic Sketchpad for Data Structure Design and Algorithm Description ; Aug. 6, 2002; IEEE; 8 pages.*

(Continued)

*Primary Examiner* — Linh K Pham
(74) *Attorney, Agent, or Firm* — Newport IP, LLC; Scott Y. Shigeta

(57) ABSTRACT

Dynamic templates include regions that provide behavior based upon a purpose or desired outcome. Templates and regions can modify the logical representations associated with objects to create semantic context for the objects. Templates and regions can also generate visual representations of objects based upon their logical representations. The visual representation utilized by a template or region can be selected manually or based upon the capabilities of a computing device. Objects contained within regions can be sorted, filtered, arranged, and projected based on their associated logical representations. Templates and regions can modify their size based upon the objects contained therein, can receive logical representations of objects from data sources and update the data sources to reflect modification of the logical representations, can initiate actions based on changes to the logical representations associated with objects, and generate structured summaries or other types of content based upon the logical representations.

20 Claims, 28 Drawing Sheets

(56) References Cited

U.S. PATENT DOCUMENTS

| | | |
|---|---|---|
| 6,724,373 B1 | 4/2004 | Oneill et al. |
| 8,819,617 B1 | 8/2014 | Koenig et al. |
| 8,832,567 B1 | 9/2014 | Jing et al. |
| 9,310,998 B2 | 4/2016 | Demiya |
| 9,501,519 B1 | 11/2016 | Joinson et al. |
| 9,921,811 B2 | 3/2018 | High et al. |
| 10,013,408 B2 | 7/2018 | Nakamori et al. |
| 10,013,409 B2 | 7/2018 | Horikiri et al. |
| 10,019,133 B1 | 7/2018 | Mcneill |
| 10,474,744 B2 | 11/2019 | Watanabe |
| 10,606,576 B1 | 3/2020 | Tung et al. |
| 10,614,419 B2 | 4/2020 | Guo et al. |
| 10,650,288 B2 | 5/2020 | Blue et al. |
| 10,698,560 B2 | 6/2020 | Axelsson et al. |
| 10,698,748 B1 | 6/2020 | Bar-on |
| 10,762,471 B1 | 9/2020 | Wang et al. |
| 11,157,273 B2 | 10/2021 | Gray et al. |
| 2005/0091578 A1 | 4/2005 | Madan et al. |
| 2006/0239248 A1 | 10/2006 | Hawk et al. |
| 2007/0078839 A1 | 4/2007 | Teodoro et al. |
| 2007/0162866 A1 | 7/2007 | Matthews et al. |
| 2007/0239828 A1 | 10/2007 | Patton et al. |
| 2008/0104536 A1 | 5/2008 | Mori |
| 2008/0136833 A1 | 6/2008 | Taniguchi et al. |
| 2010/0083109 A1 | 4/2010 | Tse et al. |
| 2010/0146450 A1 | 6/2010 | Harada |
| 2010/0149096 A1 | 6/2010 | Migos et al. |
| 2011/0115825 A1 | 5/2011 | Tetsuhashi |
| 2011/0246875 A1 | 10/2011 | Parker et al. |
| 2011/0289474 A1 | 11/2011 | Sukhenko et al. |
| 2012/0159298 A1 | 6/2012 | Fisher |
| 2012/0272186 A1 | 10/2012 | Kraut |
| 2013/0006689 A1 | 1/2013 | Kinnear et al. |
| 2013/0047093 A1 | 2/2013 | Reuschel et al. |
| 2013/0069860 A1 | 3/2013 | Davidson et al. |
| 2013/0103677 A1 | 4/2013 | Chakra et al. |
| 2013/0212463 A1 | 8/2013 | Pachikov et al. |
| 2014/0223335 A1 | 8/2014 | Pearson et al. |
| 2014/0282077 A1 | 9/2014 | Wilson et al. |
| 2014/0325448 A1* | 10/2014 | Han .................. G06F 9/452 715/835 |
| 2014/0351718 A1* | 11/2014 | Nakamori ............ G06F 3/14 715/753 |
| 2014/0365918 A1* | 12/2014 | Caldwell ............ G06F 3/0481 715/753 |
| 2015/0015504 A1* | 1/2015 | Lee .................. G06F 3/0412 345/173 |
| 2015/0082281 A1* | 3/2015 | Koenig ............. G06F 11/008 717/124 |
| 2015/0212663 A1 | 7/2015 | Papale et al. |
| 2015/0248212 A1* | 9/2015 | Breedvelt-Schouten ............... G06Q 10/10 715/850 |
| 2015/0331557 A1* | 11/2015 | Fish ................... G06F 3/0482 715/773 |
| 2015/0331573 A1 | 11/2015 | Zhu et al. |
| 2015/0347125 A1 | 12/2015 | High et al. |
| 2016/0092408 A1 | 3/2016 | Lagerblad et al. |
| 2016/0210602 A1 | 7/2016 | Siddique et al. |
| 2016/0239167 A1 | 8/2016 | Reimann et al. |
| 2016/0241609 A1 | 8/2016 | Xin et al. |
| 2017/0075542 A1 | 3/2017 | Heasman et al. |
| 2017/0132189 A1 | 5/2017 | Horikiri et al. |
| 2017/0147185 A1* | 5/2017 | Milvaney ............. G06F 3/0482 |
| 2017/0228447 A1 | 8/2017 | Catania et al. |
| 2017/0293415 A1 | 10/2017 | Mackinlay et al. |
| 2018/0151082 A1* | 5/2018 | Duggan ................. G09B 7/10 |
| 2018/0276191 A1 | 9/2018 | Yamazoe |
| 2018/0276581 A1 | 9/2018 | Sakurai et al. |
| 2018/0285321 A1 | 10/2018 | Antony et al. |
| 2018/0307406 A1 | 10/2018 | Pokrzywka |
| 2018/0314882 A1* | 11/2018 | Yu ..................... G06F 16/5866 |
| 2018/0341572 A1 | 11/2018 | Zheng et al. |
| 2019/0026000 A1 | 1/2019 | Lipman |
| 2019/0188333 A1 | 6/2019 | Williams et al. |
| 2020/0014807 A1 | 1/2020 | Kurumasa et al. |
| 2020/0019771 A1 | 1/2020 | Paget et al. |
| 2020/0035003 A1 | 1/2020 | Canberk et al. |
| 2020/0042646 A1 | 2/2020 | Nagaraja et al. |
| 2020/0320166 A1 | 10/2020 | Rouaix et al. |
| 2021/0208775 A1 | 7/2021 | Allington et al. |
| 2021/0326793 A1 | 10/2021 | Frankel |

OTHER PUBLICATIONS

Suta et al., Controlled and Collaborative Presentation via Tablet PCs for Classroom and Meeting Room Uses; 2015; IEEE; 6 pages.*

"Non Final Office Action Issued in U.S. Appl. No. 16/377,515", dated Jul. 9, 2020, 25 Pages.

"International Search Report & Written Opinion Issued in PCT Application No. PCT/US20/024353", dated Jun. 29, 2020, 11 Pages.

"International Search Report & Written Opinion issued in PCT Application No. PCT/US20/024355", dated Jul. 1, 2020, 12 Pages.

"International Search Report and Written Opinion Issued in PCT Application No. PCT/US20/061405", dated Mar. 2, 2021, 11 Pages.

"Non Final Office Action Issued in U.S. Appl. No. 16/737,822", dated Dec. 3, 2020, 15 Pages.

"Final Office Action Issued in U.S. Appl. No. 16/377,515", dated Feb. 10, 2021, 26 Pages.

"Final Office Action Issued In U.S. Appl. No. 16/737,822", dated Apr. 23, 2021, 17 Pages.

"Non Final Office Action Issued in U.S. Appl. No. 16/737,822", dated Nov. 29, 2021, 18 Pages.

* cited by examiner

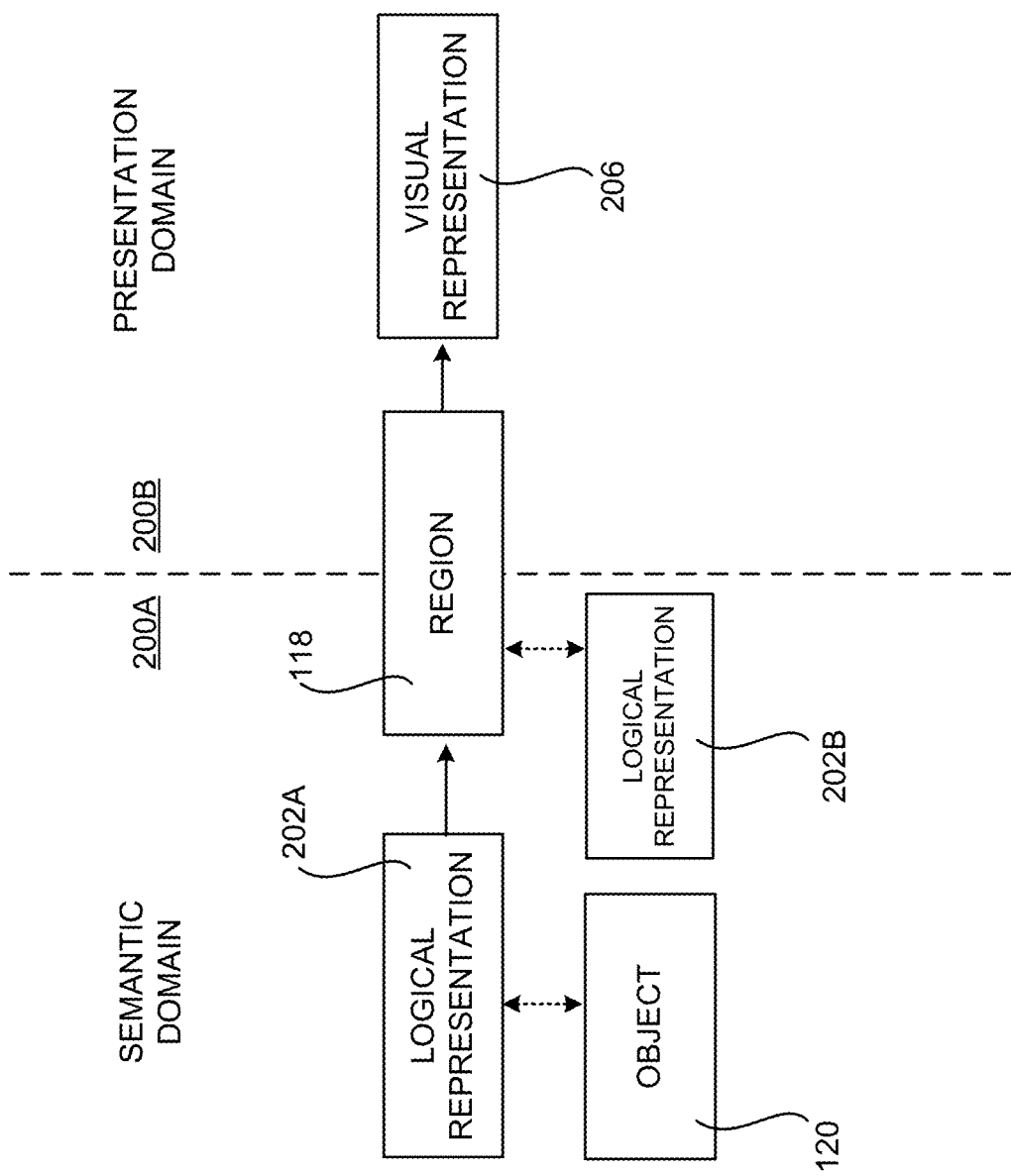

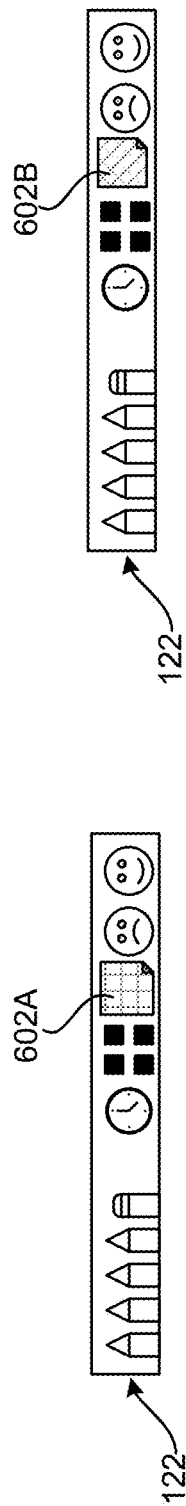
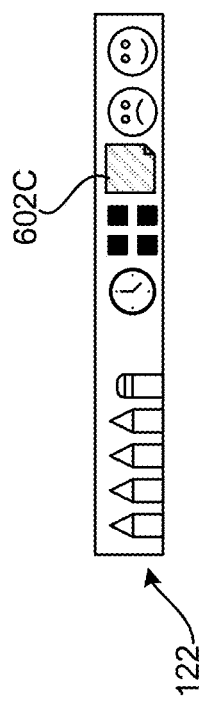

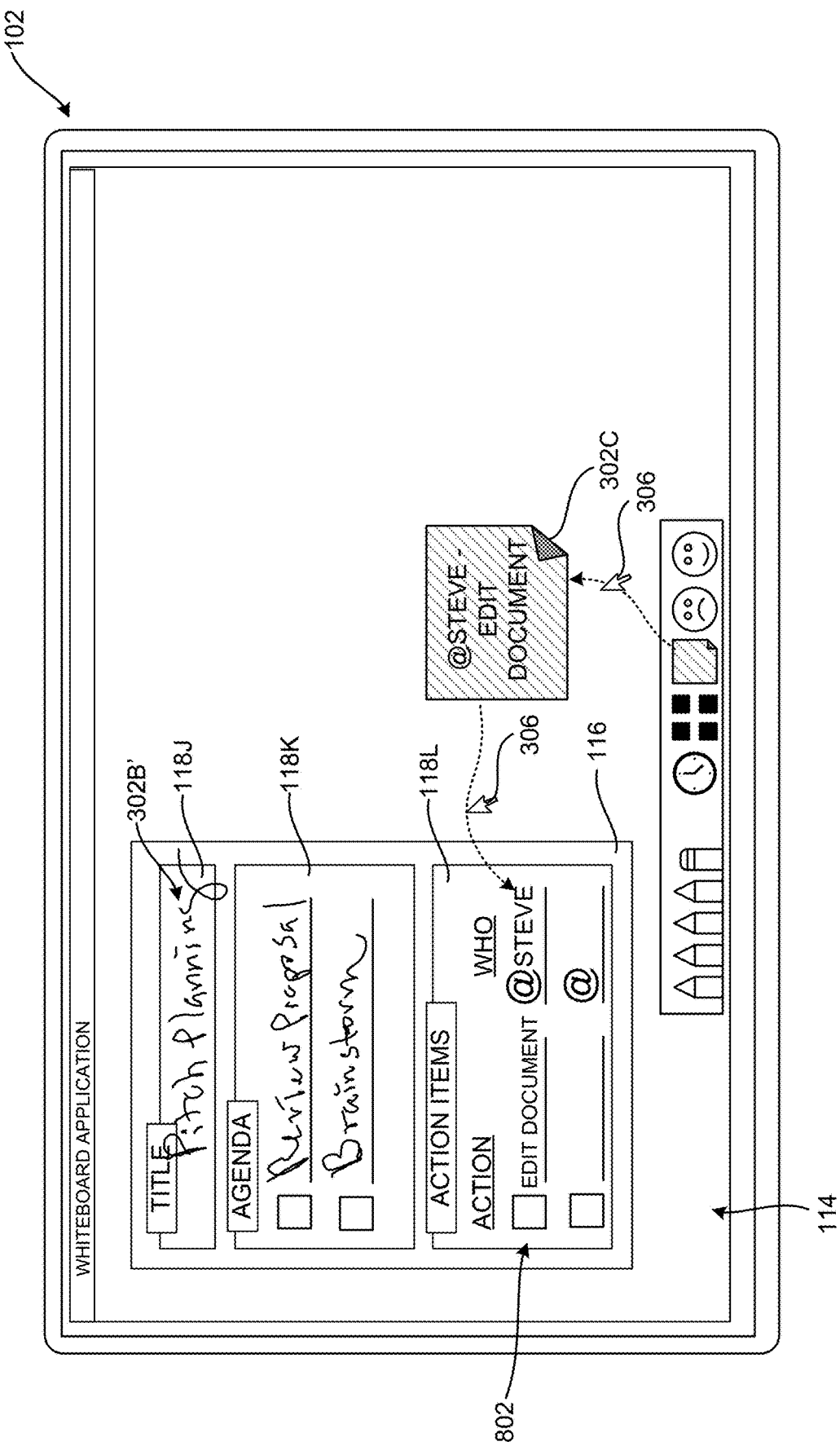

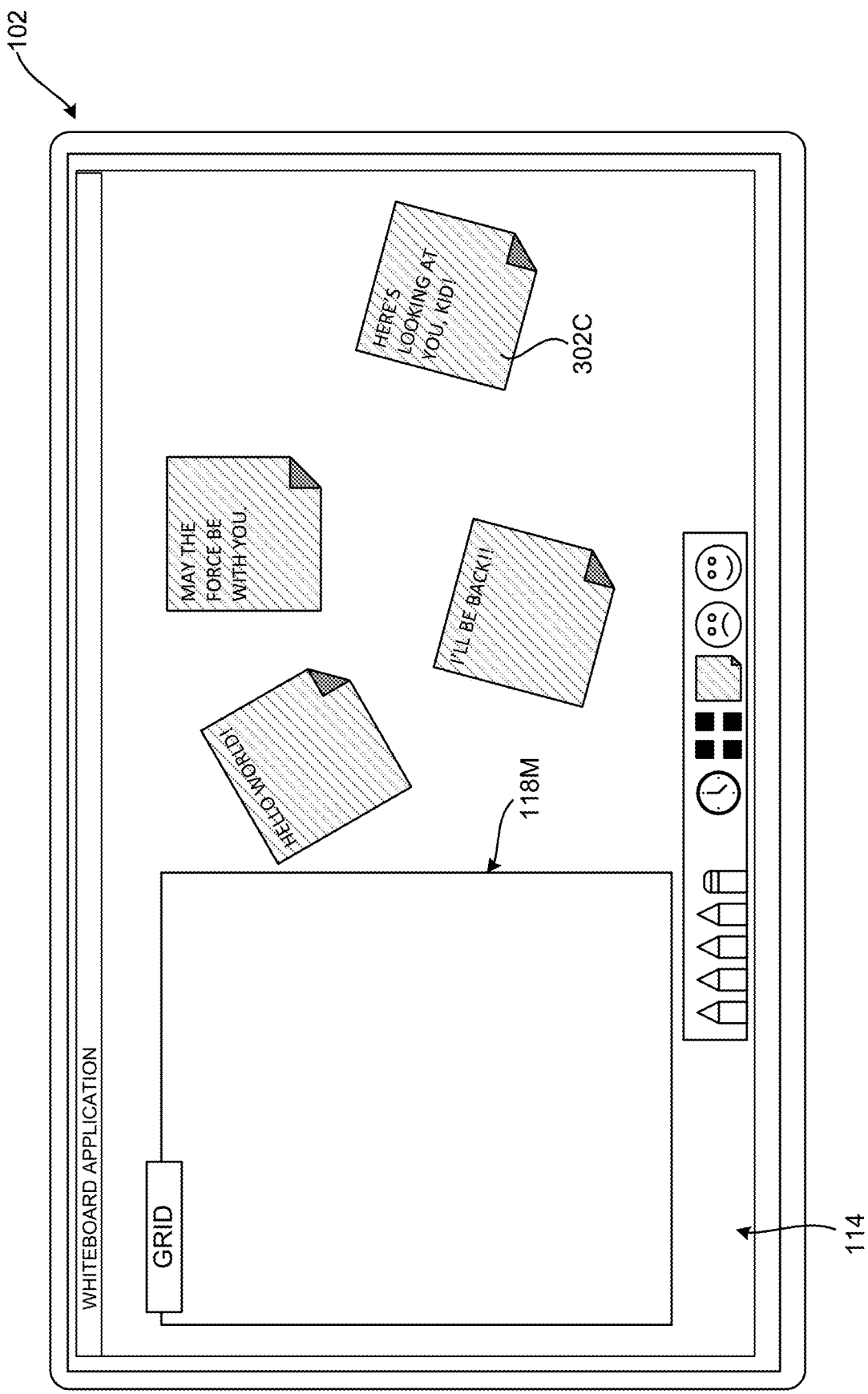

DYNAMIC WHITEBOARD REGIONS

BACKGROUND

Whiteboard applications enable users to place content on a canvas in a free-form manner. For example, users participating in a whiteboard sharing session might be permitted to draw freely on a canvas using digital ink. However, although such applications provide a great deal of freedom for creating and sharing content using a free-form digital canvas, these applications also suffer from a number of drawbacks.

One drawback of current whiteboard applications stems from the unstructured nature of a whiteboard canvas. In particular, because a whiteboard canvas is free-form, it can be difficult for users to create context and draw meaning from content on such a whiteboard. For example, users in a whiteboard sharing session might write a list of to-do items on a whiteboard canvas using digital ink. Digital ink on a whiteboard canvas does not, however, have any semantic context and, therefore, cannot be operated on such as, for example, by sorting or grouping the to-do items. In order to add semantic context to the to-do items, a user typically has to transcribe the digital ink and manually create to-do items from the transcribed text, which can take time, be error prone, and consume significant computing resources.

Some whiteboard applications attempt to add context to whiteboard content by presenting static images that can be used as guidelines for creating and managing content. Static images, however, only provide visual cues and do not provide any semantic context. As a result, users still might have to transcribe digital ink and create to-do items, or other types of contextual items, from the transcribed text which, as mentioned above, can take time, be error prone, and consume significant computing resources.

It is with respect to these and other technical challenges that the disclosure made herein is presented.

SUMMARY

Technologies are disclosed herein for providing dynamic whiteboard templates and regions. Through implementations of the disclosed technologies in conjunction with a whiteboard application, semantic context can be quickly and easily associated with heterogenous digital objects ("objects"), such as digital ink. Moreover, once the semantic context has been associated with the digital objects, the objects can be sorted, filtered, arranged, projected, and otherwise operated on based upon the semantic context. As a result, users no longer have to manually generate semantic context for digital whiteboard items (e.g. by transcribing digital ink on a whiteboard canvas and creating to-do items from the transcription) and, as a result, savings in time and utilization of computing resources can be realized. Other technical benefits not specifically mentioned herein can also be realized through implementations of the disclosed subject matter.

In order to provide the technical benefits described above, and potentially others, a digital whiteboard application is configured to present a user interface ("UI") that includes a whiteboard canvas ("canvas") upon which heterogenous objects can be placed in a free-form manner. For example, the canvas might be configured to accept digital ink in the form of text or shapes, sticky notes ("notes"), images, documents, and other types of digital objects. The objects can be placed anywhere on the canvas, and the canvas can grow in order to accommodate the objects.

The canvas can also present dynamic templates and regions. Dynamic templates can include one or more regions that together provide structure to objects contained therein, and behavior that is typically based upon a purpose or desired outcome. For example, and without limitation, a template can be defined and placed on a whiteboard canvas that includes regions configured for performing a retrospective analysis for a project (e.g. what went well, what didn't go well, what can be improved). As another example, a template might include regions for tracking the status of to-do items in a project (e.g. not started, in-progress, or complete). Templates including other types and arrangements of regions for performing other types of functions can be utilized in other configurations.

Objects, such as those on a canvas or contained within regions of a template, have associated logical representations. The logical representation for an object maintains semantic data (e.g. metadata) about the object such as, for example, data indicating the type of object, the creator, the creation date and time, and/or other types of information. Templates and regions can modify the logical representations associated with objects in order to create semantic context for the objects.

Templates and regions can also generate visual representations of objects based upon their associated logical representations. For example, and without limitation, a template might define a region on the canvas that is configured to present an object in a first visual representation (e.g. in a particular color, format, or arrangement) that is based upon the logical representation associated with the object. In this example, a user might create an object (e.g. a note containing text) on the canvas and move the object (e.g. by "dragging" the object) to the region. In response thereto, the template or the region can modify the logical representation associated with the object and present the object in the first region based on the modified logical representation.

Continuing this example, the template might also define a second region on the canvas that is configured to present objects in a second visual representation (e.g. in a different color, format, or arrangement) based upon an associated logical representation. If an object is moved from the first region to the second region, the template or the region can modify the logical representation associated with the object and the object can be displayed in the second region based on the modified logical representation.

Individual regions can also present objects contained therein in multiple different visual representations. For instance, a single region might present objects contained therein in a grid, list, table, or in another manner. The particular visual representation utilized by a template or region can be selected manually by a user or might be selected in other ways. For instance, the visual representation used by a region might be selected based upon the capabilities of a computing device. In this way, objects in a template or region can be presented differently on a computing device having a small display screen (e.g. a mobile phone) than when presented on a computing device having a larger display screen (e.g. a tablet, laptop, or desktop computing device).

Objects contained within regions can also be sorted, filtered, arranged, projected, and otherwise operated on based on their associated logical representations. Templates and regions can also modify their size based upon the objects contained therein. For example, a template or region might change its size to accommodate an object moved from a region or the canvas.

In some configurations, templates and regions can receive logical representations of objects from data sources. For example, a template or region might receive logical representations of objects corresponding to to-do list items from a connected data source. As discussed above, the logical representations might be modified, such as when moving a corresponding object between regions. When logical representations are modified in this way, the template or region can update the appropriate data source to reflect the modification. For instance, if an object is moved from a region containing objects for to-do items that have not been started to a region containing objects for completed to-do items, the logical representation associated with the object can be modified to indicate the completion, and a data source can be updated with the modified logical representation. Other views of the same data can then be updated based on the modified logical representation.

In some embodiments, templates can define template and/or user-specific toolbars. The toolbars can include tools for creating objects on the canvas. For example, a toolbar might include a tool for creating a new note on the canvas in a user-specific color. Toolbars can also include tools for modifying the logical representations associated with objects on the canvas or in regions. For instance, a toolbar might include tools for up or down-voting objects on the canvas or in a region.

Templates and regions can also be configured to initiate actions based on changes to the logical representations associated with objects. For example, and without limitation, if an object's logical representation is modified following movement from one region to another region, a template or region might initiate an action for transmitting an email or another type of message (e.g. when a to-do list item is completed).

The logical representations for templates, regions, and objects can also be utilized to generate structured summaries and other types of data. For example, a summary might be generated having a title, a section listing agenda items, and a section listing action items. The items in each section can be identified based upon the logical representations for the corresponding objects. Other types of content can also be generated based upon the semantic context contained in the logical representations associated with objects in templates or regions.

It is to be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A, 1B, and 2 are schematic diagrams illustrating aspects of the configuration and operation of a computing device configured to implement the disclosed technologies, according to one particular configuration;

DETAILED DESCRIPTION

Figure 1A:
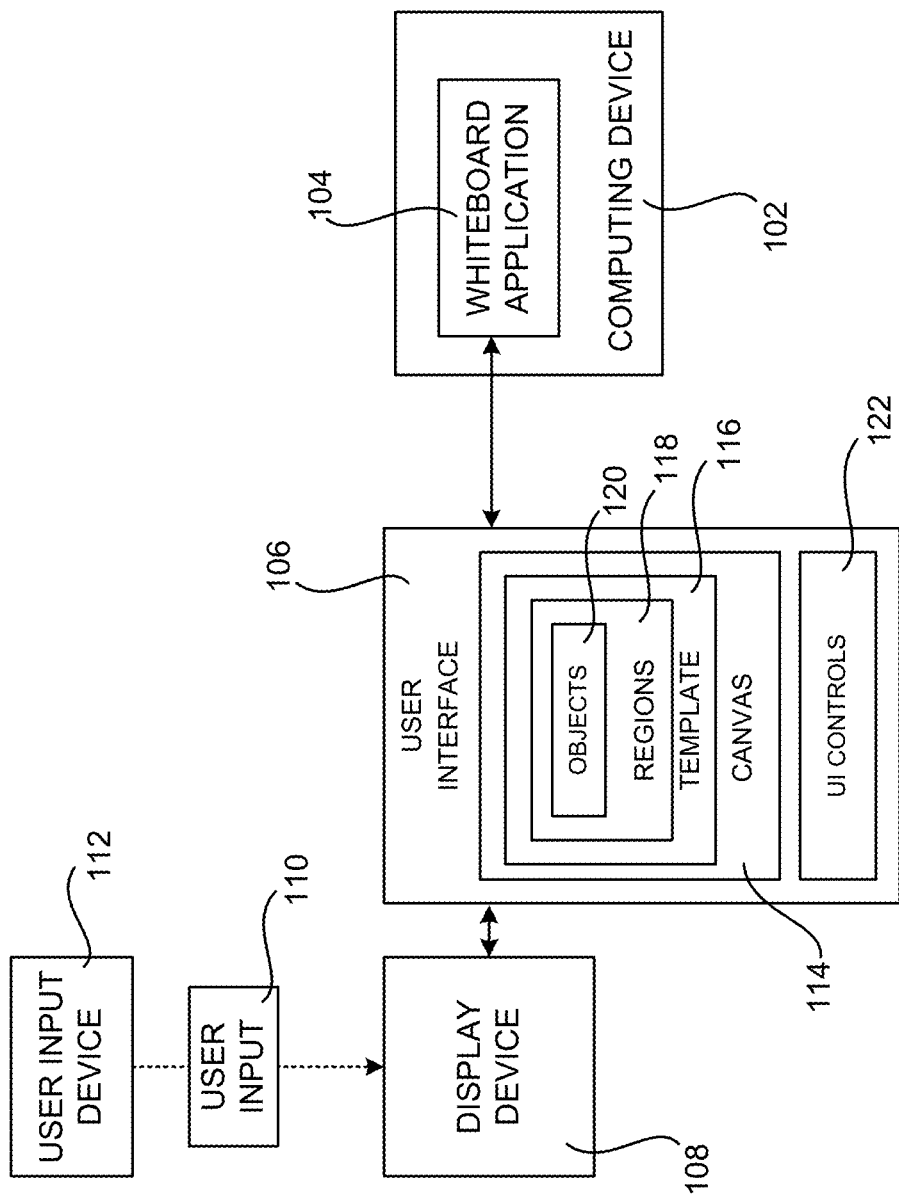

The following detailed description is directed to technologies for providing dynamic whiteboard templates and regions. As discussed briefly above, implementations of the disclosed technologies enable semantic context to be quickly and easily associated with heterogenous digital objects on a digital whiteboard, such as digital ink. Once semantic context has been associated with the digital objects, the objects can be sorted, filtered, arranged, modified, projected, summarized, exported, and otherwise operated on based upon the semantic context. The disclosed technologies can realize savings in time and utilization of computing resources and can increase the productivity of users of the technologies presented herein. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing dynamic whiteboard templates and regions will be described.

FIG. 1A is a schematic diagram illustrating aspects of the configuration and operation of a digital ink capable computing device 102 (which might also be referred to herein as "the computing device 102" or simply "the device 102") that implements the disclosed technologies in one particular configuration. The computing device 102 can be any type of computing device (e.g. a tablet, laptop, desktop, or smartphone) that includes functionality for enabling a user to compose text or drawings from stroke inputs, sometimes referred to as "strokes" of digital ink. For example, the computing device 102 might be configured to accept digital ink input via natural user interface input methods (e.g., touch or gesture), via a handwriting input device (e.g., a digital pen or stylus), or by movement of a mouse pointer, touchpad pointer, etc.

In order to enable inking in the manner described above, the computing device 102 can be configured with a touch-sensitive display device 108. The touch-sensitive display device 108 can detect user input 110 made by a user input device 112 (e.g. a digital pen, stylus, mouse, etc.) or via touch or gesture made by a finger or other appendage. User input made to the display device 108 using any mechanism might be referred to herein as a "touch."

It is to be appreciated that while the technologies disclosed herein are primarily presented in the context of a digital ink capable computing device 102, the disclosed technologies are not limited to use with such a computing system. Rather, the technologies disclosed herein can be utilized with computing systems not equipped with touch or digital ink capabilities such as, but not limited to, desktop or laptop computers. In this regard, it is also to be appreciated that while the embodiments disclosed herein are implemented by a whiteboard application 104, the disclosed technologies can be practiced with other types of applications, such as another type of collaboration application, a presentation application, or a word processing application.

In order to provide the technical benefits described above, and potentially others, a digital whiteboard application 104 executes on the computing device 102. The whiteboard application 104 is configured to present a user interface ("UI") that includes a whiteboard canvas ("canvas") 114 upon which heterogenous objects 120 can be placed in a free-form manner. For example, the canvas 114 might be configured to accept digital ink in the form of text or shapes, sticky notes ("notes"), images, documents, and other types of digital objects 120. The objects 120 can be placed anywhere on the canvas 114, and the canvas 114 can grow in order to accommodate the objects 120. Additional details regarding one illustrative canvas 114 will be provided below with regard to FIG. 3.

The canvas 114 can also present dynamic templates 116 and regions 118. Dynamic templates 116 can include one or more regions 118 that together provide structure to objects 120 contained therein, and behavior that is typically based upon a purpose or desired outcome. For example, and without limitation, a template 116 can be defined and placed on a whiteboard canvas 114 that includes regions 118 configured for performing a retrospective analysis for a project (e.g. performing an analysis of what went well, what didn't go well, and what can be improved for a project). As another example, a template 116 might include regions 118 for tracking the status of to-do items in a project (e.g. not started, in-progress, or complete). Templates 116 including other types and arrangements of regions 118 for performing other types of functions can be utilized in other configurations. Details regarding the functionality provided by templates 116, regions 118, and objects 120 will be provided below.

As also shown in FIG. 1A, the UI 106 can include UI controls 122. The UI controls 122 can be configured as a toolbar that includes tools for selecting a pen and type of digital ink (e.g. color, pen thickness, pen type, etc.), for deleting digital ink, for creating other types of objects 120 such as notes, for setting a timer for voting on objects 120 on the canvas 144, for up-voting or down-voting objects 120, for organizing the objects 120 on the canvas 114, or for performing other functions, some of which will be described in greater detail below. As will be discussed in greater detail below with regard to FIGS. 6B-6D, the UI controls 122 can be template and/or user-specific. For ease of discussion, the UI controls 122 might be referred to herein as the toolbar 122.

Figure 1B:
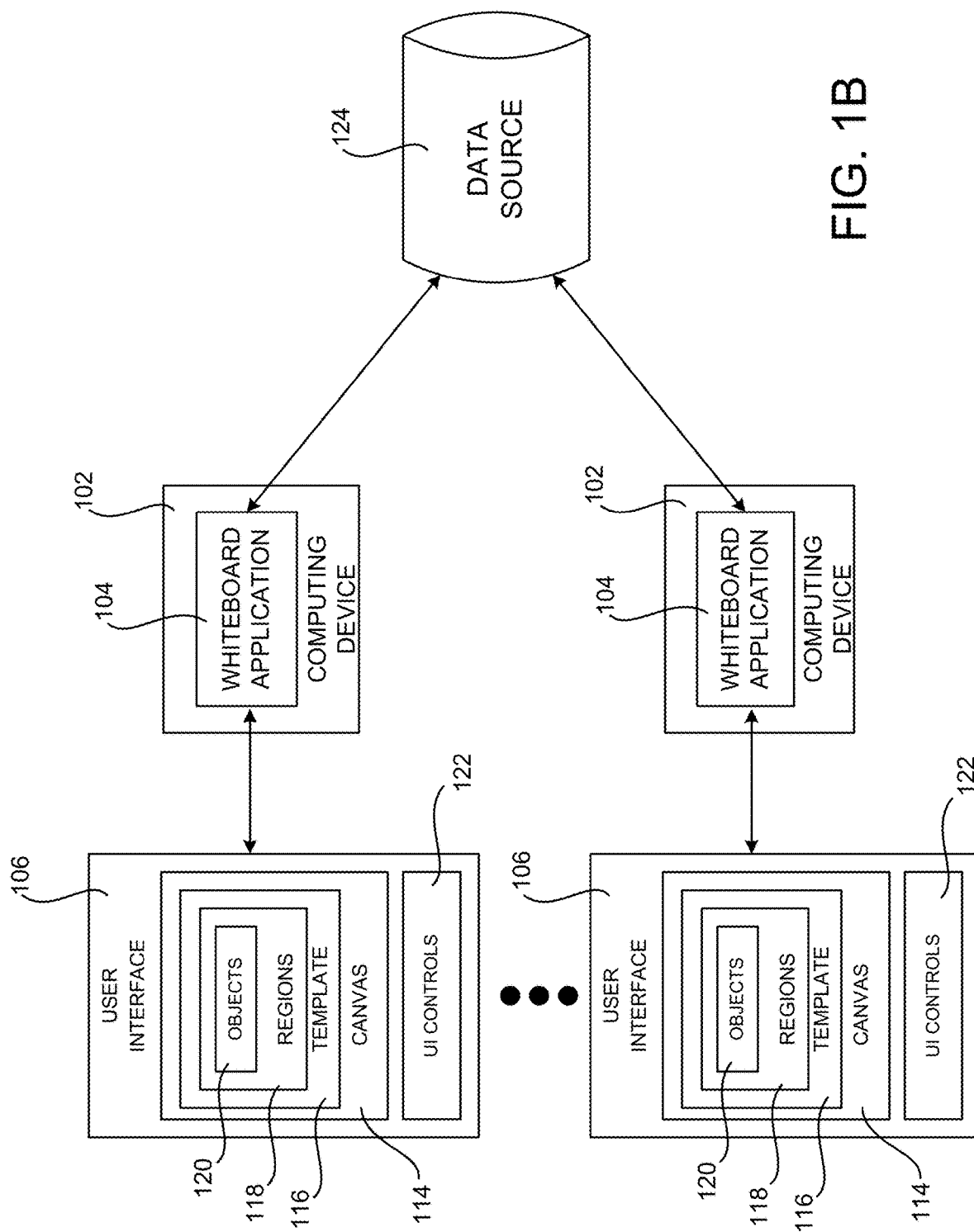

Turning now to FIG. 1B, additional aspects of the operation of the whiteboard application 104 will be described. As shown in FIG. 1B, users of multiple computing devices 102 can utilize instances of the whiteboard application 104 simultaneously to share a whiteboard (i.e. a canvas 114). Each of the users can utilize their respective computing device 102 to add, edit, or remove objects 120 to/from the canvas 114. Multiple users can also utilize their respective instances of the whiteboard application 104 to create and interact with the templates 116 and regions 118 disclosed herein in the manner described below.

In order to synchronize objects 120, templates 116, and regions 118 between multiple user computing devices 102, the computing devices 102 can connect to a remote data source 124. The data source 124 can store data (not shown in FIG. 1B) for synchronizing the contents of the canvas 114 between multiple user computing devices 102. The data can be synchronized in real or near real time in order to facilitate interactivity between the users and the contents of the canvas 114. In other configurations, a peer-to-peer model might be utilized to synchronize data between instances of the whiteboard application 102 executing on multiple computing devices 102. Other implementations will be apparent to those skilled in the art.

Referring now to FIG. 2, additional details regarding the operation of the regions 118 within a template 116 will be described. As shown in FIG. 2, objects 120, such as those on a canvas 114 or contained within regions 118 of a template 116, have associated logical representations 202A. The logical representation 202A for an object 120 is a data structure that maintains semantic data (e.g. metadata) about the object 120 such as, for example, data indicating the type of object 120, the object's creator, the creation date and time, and/or other types of information. Because the logical representation 202A for an object 120 maintains semantic information for the object 120, the logical representation 202A might be said to exist in a semantic domain 200A.

As shown in FIG. 2, regions 118 can also include logical representations 202B. A logical representation 202B for a region 118 is a data structure that defines metadata for the region 118. For example, a logical representation 202B might specify the type of region 118, the types of objects 120 that the region 118 supports, and/or rules for modifying the logical representations 202A associated with objects 120 placed in the region 118. The logical representations 202A and 202B can include alternate or additional information in other configurations.

As also shown in FIG. 2 and discussed briefly above, templates 116 and regions 118 can also generate visual representations 206 of objects 120 based upon their associated logical representations 202A and 202B. For example, and without limitation, a template 116 might define a region 118 on the canvas 114 that is configured to present an object 120 in a first visual representation 206 (e.g. in a particular color, format, or arrangement) that is based upon the logical representation 202A associated with the object 120. As will be described in greater detail below, regions 118 can be configured to present objects 120 in multiple different visual representations 206. Presentation of a visual representation 206 on the canvas 114 might be referred to herein as occurring within a presentation domain 200B.

As will also be described in greater detail below, templates 116 and regions 118 can also modify the logical representations 202A associated with objects 120 in order to create, modify, or remove semantic context for the objects 120. For example, and without limitation, a user might create an object 120 (e.g. a note object containing text) on the canvas 114 and move the object 120 (e.g. by "dragging" the object) to a region 118. In response thereto, the template 116 or the region 118 can modify the logical representation 202A associated with the object 120 and present the object 120 in the region 118 based on the modified logical representation 202A. For example, the region 118 might present the text from a note object as an item in a to-do list. In this example, the region 118 or the template 116 modifies the logical representation 202A associated with the object 120 to indicate that the object 120 is a to-do list item.

Once a semantic context has been associated with objects 120, the objects 120 can be sorted, filtered, arranged, projected, and otherwise operated on by a template 116 or region 118 based upon the semantic context. Additional details regarding this aspect will be described below.

Figure 3:
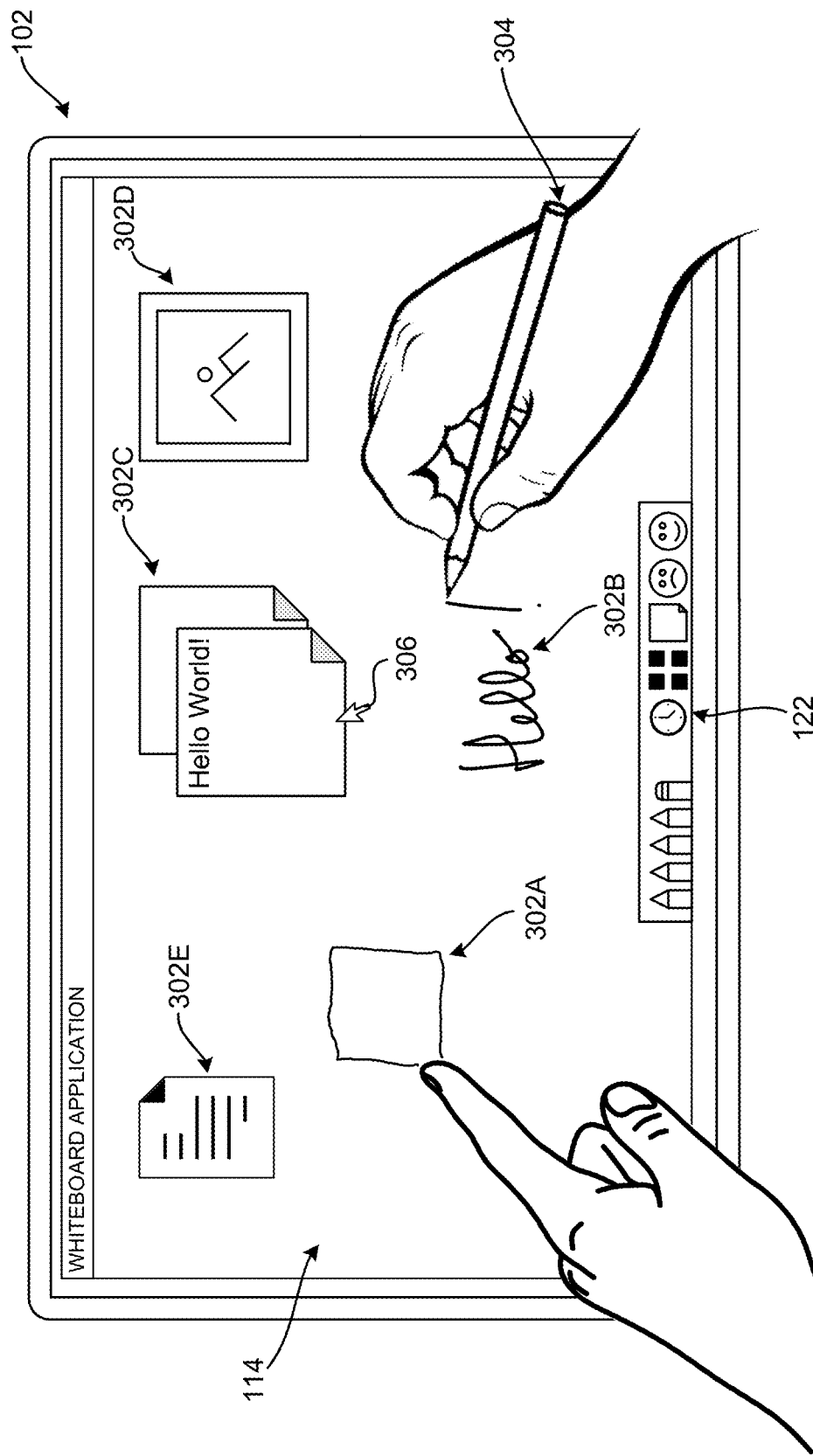
FIG. 3 is a pictorial diagram showing additional aspects of the configuration and operation of the computing device illustrated in FIG. 1.

FIG. 3 is a pictorial diagram showing additional aspects of the configuration and operation of the illustrative computing device 102 shown in FIGS. 1A and 1B. In the example shown in FIG. 3, the computing device 102 is a tablet computer. As discussed above, other types of digital ink capable and non-digital ink capable computing devices 102 can be used in other configurations.

A user can interact with the surface of the tablet computer shown in FIG. 3 with their hand, with a digital pen 304, using a mouse user input device and a mouse cursor 306, or in another manner. In the illustrated example, a user has utilized their hand and a digital pen 302 to create a number of objects 120 on the canvas 114 shown on the display device 108 of the computing device 102. In particular, the user has drawn a digital ink object 302A in the shape of a square with their hand. The user has also utilized a digital pen 304 to create a digital ink object 302B corresponding to the word "Hello!" The user has also placed a document object 302E, several note objects 302C, and a picture object 302D on the canvas 114. Other types of objects 120 can be placed on the canvas 114 in a similar manner.

As discussed above, the canvas 114 is configured to enable heterogenous objects 120 to be placed in a free-form manner. The objects 120 can be placed anywhere on the canvas 114, and the canvas 114 can grow in order to accommodate the objects 120. The canvas 114 can provide other types of functionality not specifically mentioned herein.

As shown in FIG. 3 and described briefly above, UI controls 122 can be presented adjacent to or overlapping the canvas 114 in the UI 106. In the illustrated example, the UI controls 122 are configured as a toolbar that includes tools for selecting a pen and type of digital ink (e.g. color, pen thickness, pen type, etc.), for deleting digital ink (e.g. an eraser), for creating other types of objects 120 such as notes, for setting a timer for voting on objects 120 on the canvas 144, for up-voting or down-voting objects 120, and for organizing the objects 120 on the canvas 114. Other tools can be presented in the toolbar in other configurations. As will be discussed in greater detail below with regard to FIGS. 6B-6D, the UI controls 122 can be template and/or user-specific.

Figure 4:
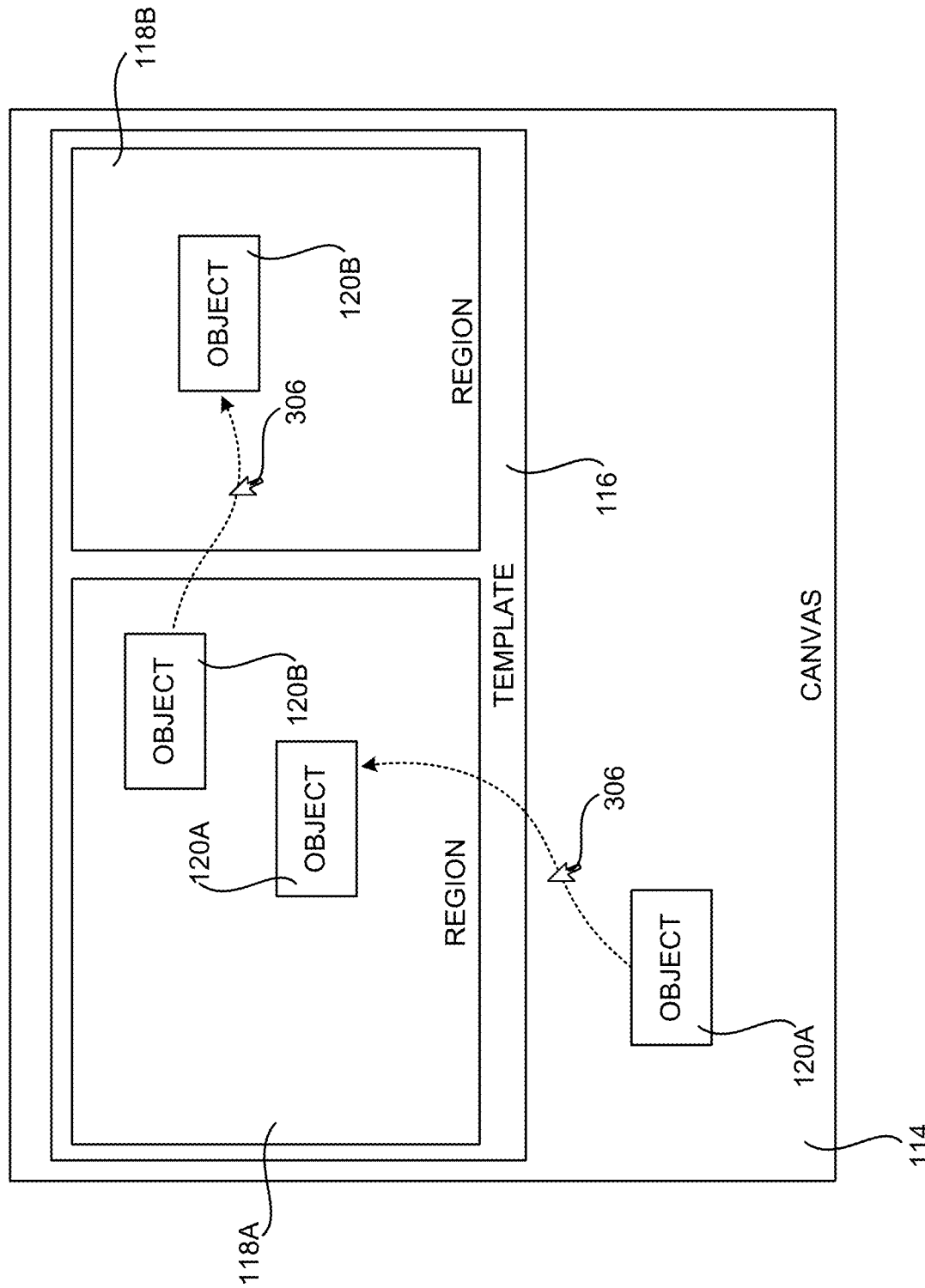
FIG. 4 is a user interface diagram showing aspects of a user interface provided by a whiteboard application executing on the computing device shown in FIG. 1 that includes an illustrative template having two regions.

FIG. 4 is a user interface diagram showing aspects of the UI 106 provided by the whiteboard application 104 executing on the computing device 102 shown in FIGS. 1A-3. In this example, a template 116 has been placed on the canvas 114. The example template 116 shown in FIG. 4 includes two regions 118A and 118B. Templates 116 can include other arrangements and types of regions 118 in other configurations. Additionally, regions 118 can exist outside of templates 116 in some configurations.

In the example shown in FIG. 4, a user has placed an object 120A on the canvas 114. As discussed above, the object 120A has an associated logical representation 202A providing semantic context for the object 120A. The logical representation 202A might specify, for example, the object type for the object 120A, the creator of the object 120A, etc.

In the illustrated example, a user has selected the object 120A using a mouse cursor 306 and moved the object 120A from the canvas 114 to a region 118A (e.g. through a "dragging" motion"). In response thereto, the region 118A has modified the logical representation 202A associated with the object 120A. For example, the region 118A might modify the logical representation 202A to change or add metadata. A user has also dragged the object 120B from the region 118A to the region 118B in the example shown in FIG. 4. In a similar fashion, the region 118B might modify the logical representation 202A associated with the object 120C.

As described briefly above, templates 116 and regions 118 can also generate visual representations 206 of objects 120 based upon their associated logical representations 202. In the example shown in FIG. 4, for instance, the template 116 might define a region 118A on the canvas 114 that is configured to present an object 120 in a first visual representation 206 (e.g. in a particular color, format, or arrangement) that is based upon the logical representation 202 associated with the object 120. In this example, the template 116 might also define a second region 118B on the canvas 114 that is configured to present objects 120 in a second visual representation 206 (e.g. in a different color, format, or arrangement) based upon an associated logical representation 202. If an object 120 (e.g. the object 120B in FIG. 4) is moved from the first region 118A to the second region 118B, the template 116 or the region 118 can modify the logical representation 206 associated with the object 120 and the object 120 can be displayed in the second region 118B based on the modified logical representation 206. Additional details regarding this process will be provided below.

Figure 5:
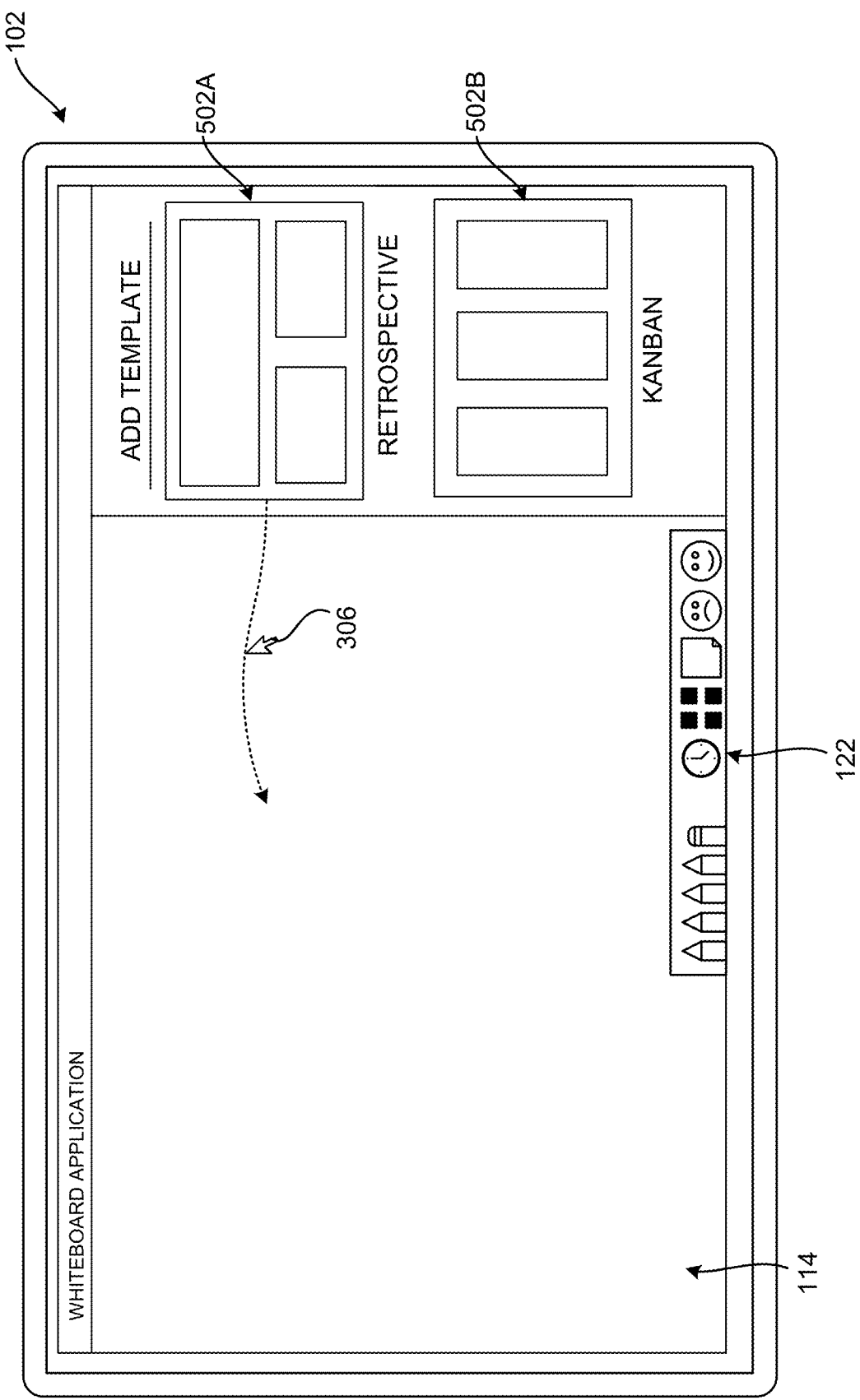
FIGS. 5-9I are user interface diagrams illustrating additional aspects of the operation of the computing device shown in FIG. 1 for providing dynamic whiteboard templates and regions.
Figure 6A:
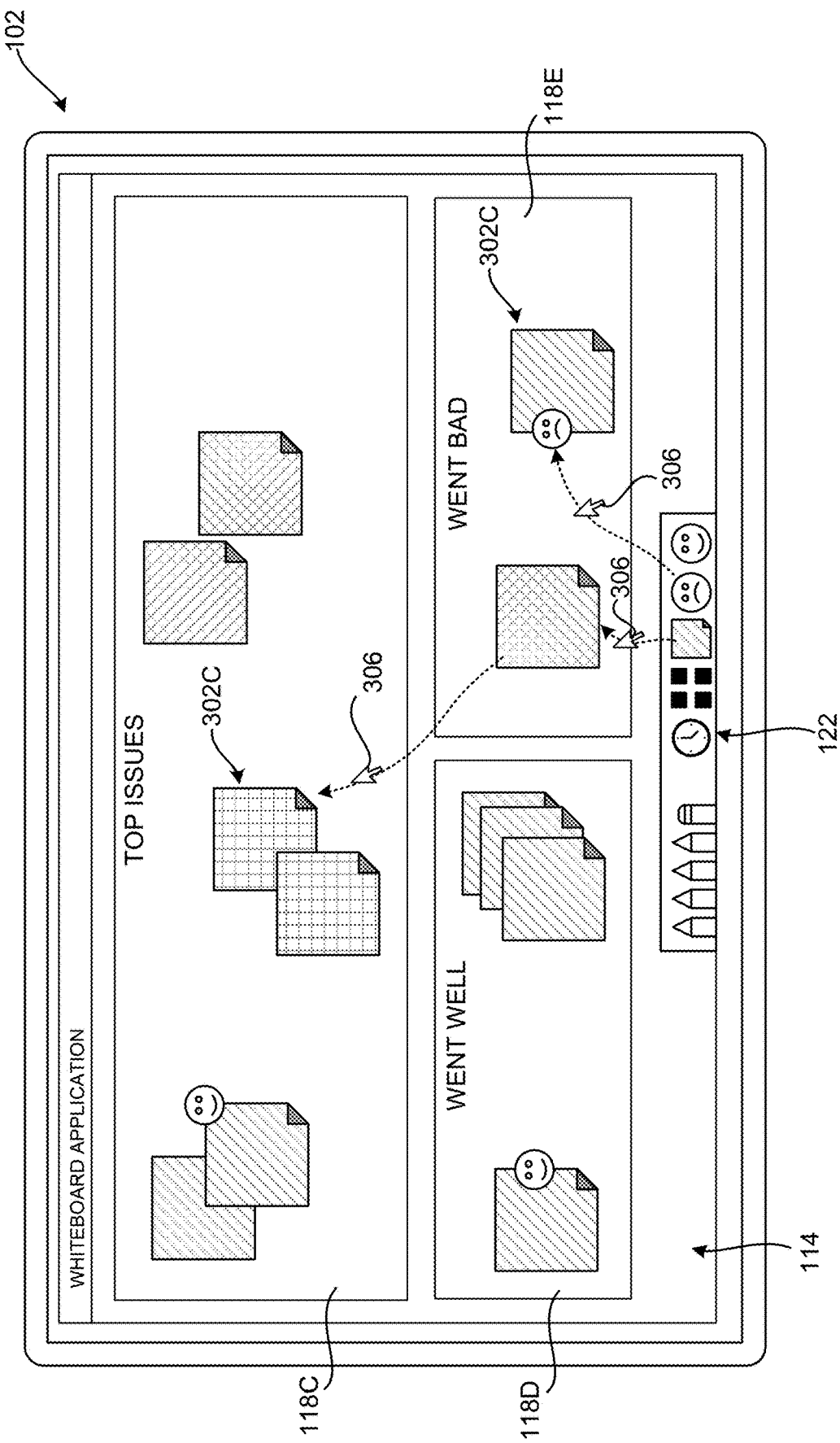
Figure 6E:
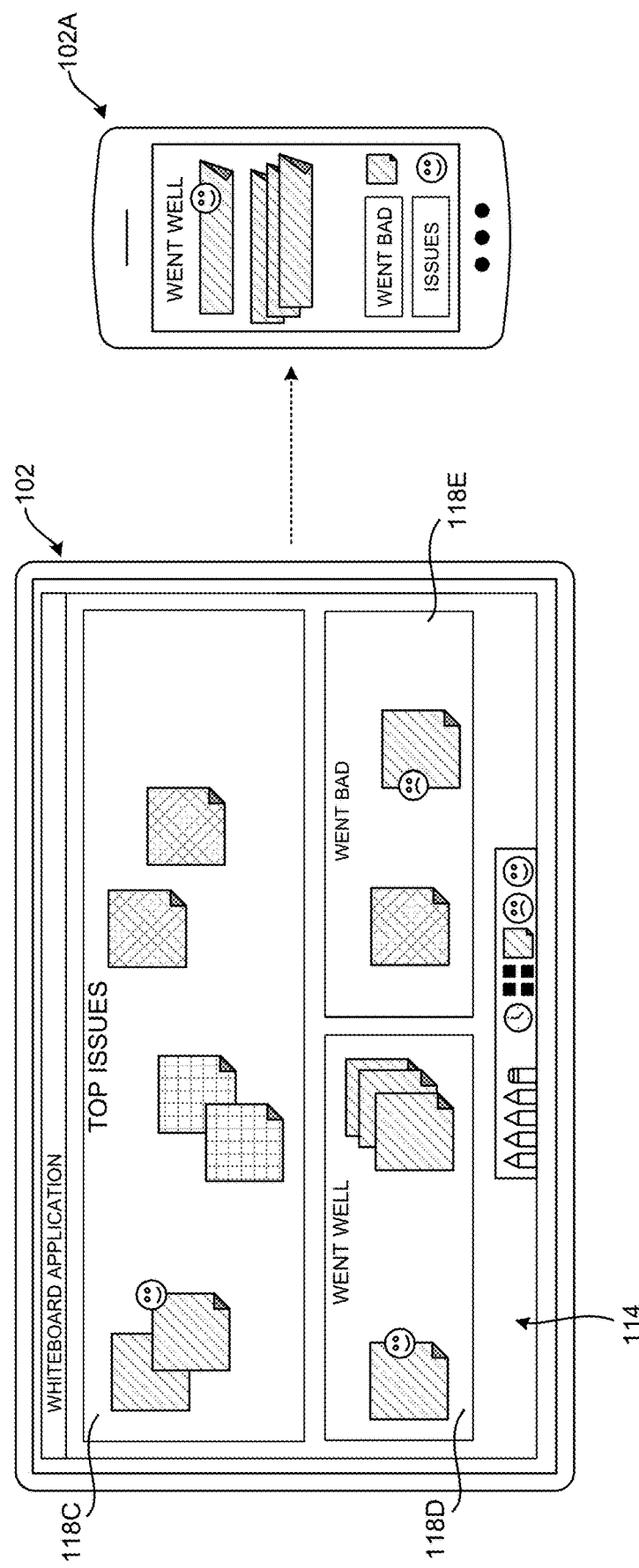
Figure 6F:
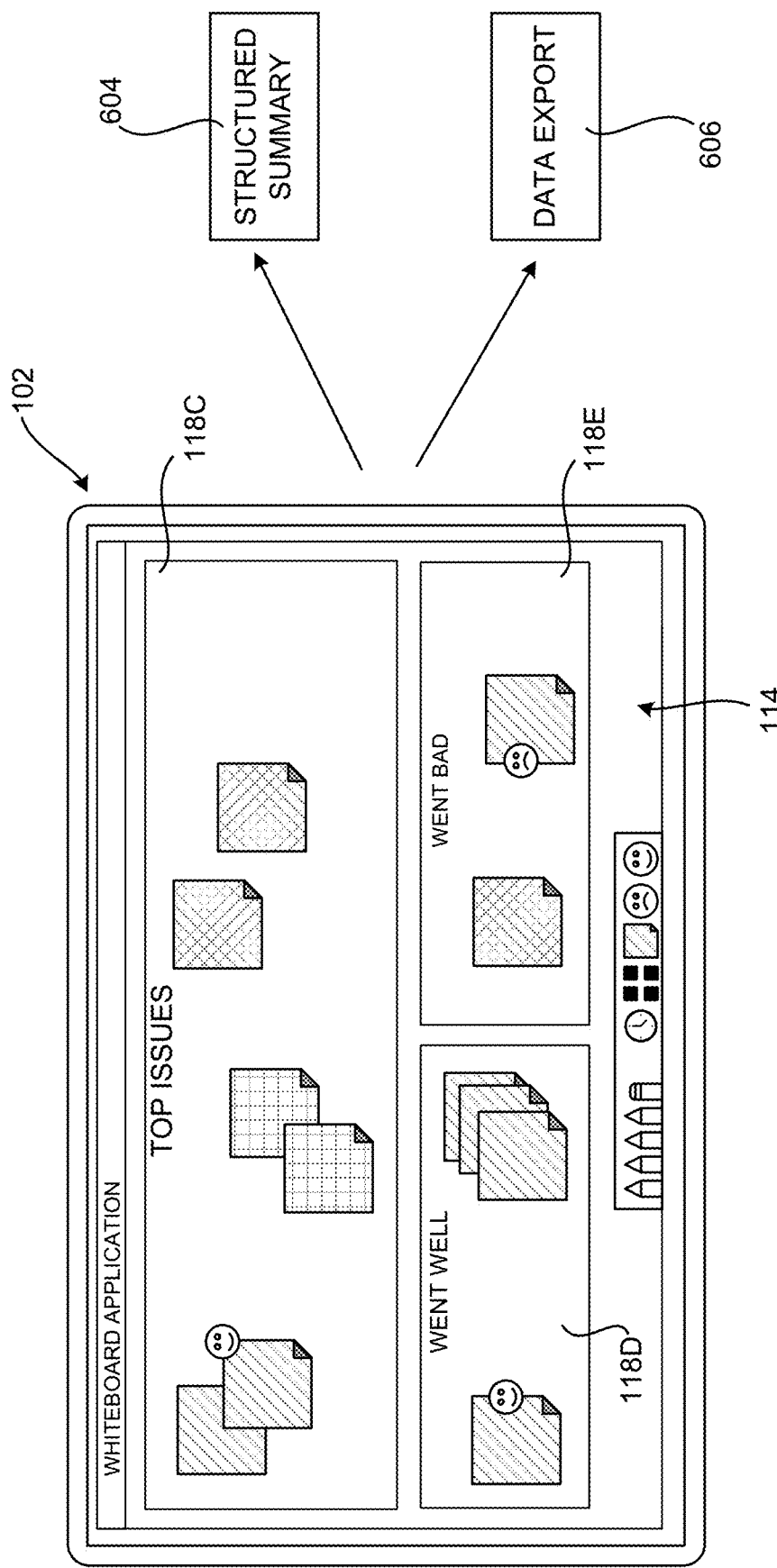

FIGS. 5-6F are user interface diagrams illustrating additional aspects of the operation of the computing device 102 and whiteboard application 104 described above. In particular, FIG. 5 shows an illustrative configuration of the UI 106 for selecting a template 116.

In this the example shown in FIG. 5, thumbnail images 502A and 502B of several templates 116 are shown in the UI 106. The thumbnail image 502A corresponds to a template 116 for performing a retrospective on a project (e.g. performing an analysis of what went well, what didn't go well, and what can be improved for a project). The thumbnail image 502B corresponds to a template 116 for managing a project (commonly referred to as a "Kanban"). A Kanban template 116 might include functionality for tracking the status of to-do items in a project (e.g. not started, in-progress, or complete). Templates 116 including other types and arrangements of regions 118 for performing other types of functions can be utilized in other configurations.

In the example shown in FIG. 5, a user has selected the thumbnail 502A corresponding to the project retrospective template 116 using a mouse cursor 306 and dragged the thumbnail image 502A onto the canvas 114. In response thereto, the corresponding template 116 has been placed on the canvas 116. This is illustrated in FIG. 6A.

As shown in FIG. 6A, the retrospective template 116 includes regions 118C, 118D, and 118E. The region 118C includes objects 120 that correspond to the top issues in a project, the region 118D includes objects 120 corresponding to project tasks that went well, and the region 118E includes objects 120 corresponding to project tasks that went badly.

In the example shown in FIG. 6A, a user has utilized the mouse cursor 306 to drag note objects 302C from the toolbar to the regions 118C-118E. In response to the note objects 302C being placed in the regions 118C-118E, the template 116 or the regions 118 have modified the logical representations 202 associated with the note objects 302C. For instance, when a note object 302C is moved into the region 118C, the logical representation 202 associated with that note object 302C is modified to indicate that the object corresponds to a top issue.

Similarly, when a note object 302C is moved to the region 118D, the logical representation 202 associated with that note object 302C is modified to indicate that the object corresponds to a project task that went well. Similarly, when a note object 302C is moved to the region 118E, the logical representation 202 associated with that note object 302C is modified to indicate that the object corresponds to a project task that went badly. Other types of modifications to the logical representations 202 can be performed by other types of regions 118 in templates 116 for accomplishing other types of tasks.

In the example shown in FIG. 6A, the user has also dragged a note object 302C from the region 118E to the region 118C. In response thereto, the template 116 or the region 118C has modified the logical representation 202 associated with the relocated note object 302C to indicate that the object corresponds to a top issue rather than a project task that went badly.

A user has also utilized the toolbar shown in FIG. 6A to indicate a dislike for one of the note objects 302C in the region 118E. In particular, a user has dragged an icon (i.e. a frowning face) from the toolbar to the note object 302C in the region 118E. In response thereto, the template 116 or the region 118C has modified the logical representation 202 associated with the destination note object 302C to indicate that the note has been disliked. A user might indicate a like, an upvote, a downvote, or other types of sentiment for a particular object 120 in a similar fashion.

As discussed briefly above, in some embodiments, templates 116 can define template and/or user-specific toolbars 122. For example, and as shown in FIGS. 6B-6D, a toolbar 122 might include a tool 602 for creating a new note object 302C on the canvas 133 in a user-specific color or other visual attribute. In the examples shown in FIG. 6B-6D, for instance, the tool 602A can be used to create a note object 302C (indicated by vertical/horizontal hatching) for one user, the tool 602B can be used to create a note object 302C (indicated by diagonal hatching) for another user, and the tool 602C can be used to create a note object 302C (indicated by diagonal hatching) for yet another user.

Note objects 302 (and other objects) created using such a user-specific UI tool identify the creating user through a user-specific visual attribute, such as color, that is used to present the objects in the regions 118. Other types of user or template-specific tools can be provided in other configurations.

As also discussed briefly above, the particular visual representation 206 implemented by a template 116 or region 118 can be selected manually by a user or might be selected in other ways. For instance, and as illustrated in FIG. 6E, the visual representation used by a region 118 might be selected based upon the capabilities of a computing device. In the example shown in FIG. 6E, a tablet computing device 102 presents the regions 118C-118E in a manner that is suitable for the size of its display. The computing device 102A, which is displaying the same template 116 and regions 118, presents the regions 118C-118E in a manner that is suitable for its smaller display.

In this way, objects 120 in a template 116 or region 118 can be presented differently on a computing device 102A having a small display screen (e.g. a mobile phone) than when presented on a computing device 102 having a larger display screen (e.g. a tablet, laptop, or desktop computing device). The particular visual representation 206 selected for presenting a particular template 116 or region 118 might selected based upon other hardware or software capabilities of the computing device 102 upon which it is displayed.

As shown in FIG. 6F, the logical representations 202 for templates 116, regions 118, and objects 120 can also be utilized to generate structured summaries 604, data 606 for export (e.g. to a presentation application, a spreadsheet application, or a word processing application), and other types of data in some configurations. For example, a structured summary 604 might be generated having a title, a section listing top issues with a project, project tasks that went well, and project tasks that went bad. The items in each section of the structured summary 604 can be identified based upon the logical representations 202 for the corresponding objects 120 (e.g. the note objects 302 in FIG. 6F). Other types of content can also be generated based upon the semantic context contained in the logical representations 202 associated with objects 120 in templates 116 or regions 118.

Figure 7A:
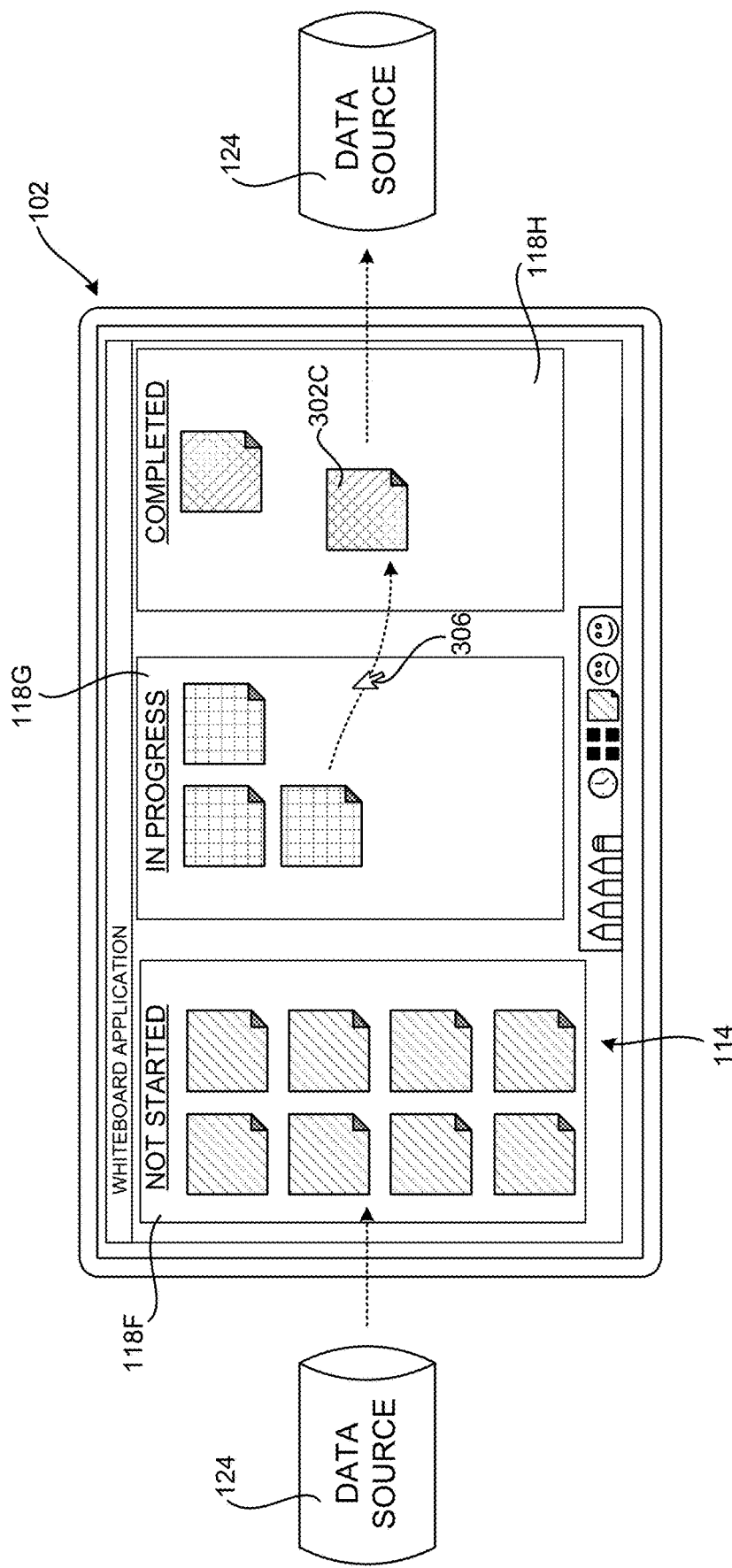

In some configurations, templates 116 and regions 118 can retrieve logical representations 202 of objects 120 from one or more data sources 124. For example, and as shown in FIG. 7A, a template 116 or region 118 might receive logical representations 202 for objects 120 corresponding to to-do list items from a connected data source 124. In the illustrated example, logical representations 202 for the note objects 302C shown in the regions 118F-118H are retrieved from a data source 124. As discussed above, a template 116 or the regions 118F-118H themselves can use the logical representations 202 to present the note objects 302C in the illustrated user interface.

As discussed above, the logical representations 202 associated with objects 120 might be modified, such as when moving a corresponding object 120 between regions. When logical representations 202 are modified in this way, the template 116 or region 118 can update the appropriate data source 124 to reflect the modification.

In the illustrated example, for instance, a note object 302C is moved from a region 118G showing note objects 302C for in-progress to-do items to a region 118H showing note objects 302C for completed to-do items. In this example, the logical representation 202 associated with the moved note object 302C can be modified to indicate the completion of the to-do item, and the data source 124 can be updated with the modified logical representation 202. Other views of the same data at other instances of the whiteboard application 104 can then be updated based on the modified logical representation 202 stored at the data source 124.

Figure 7B:
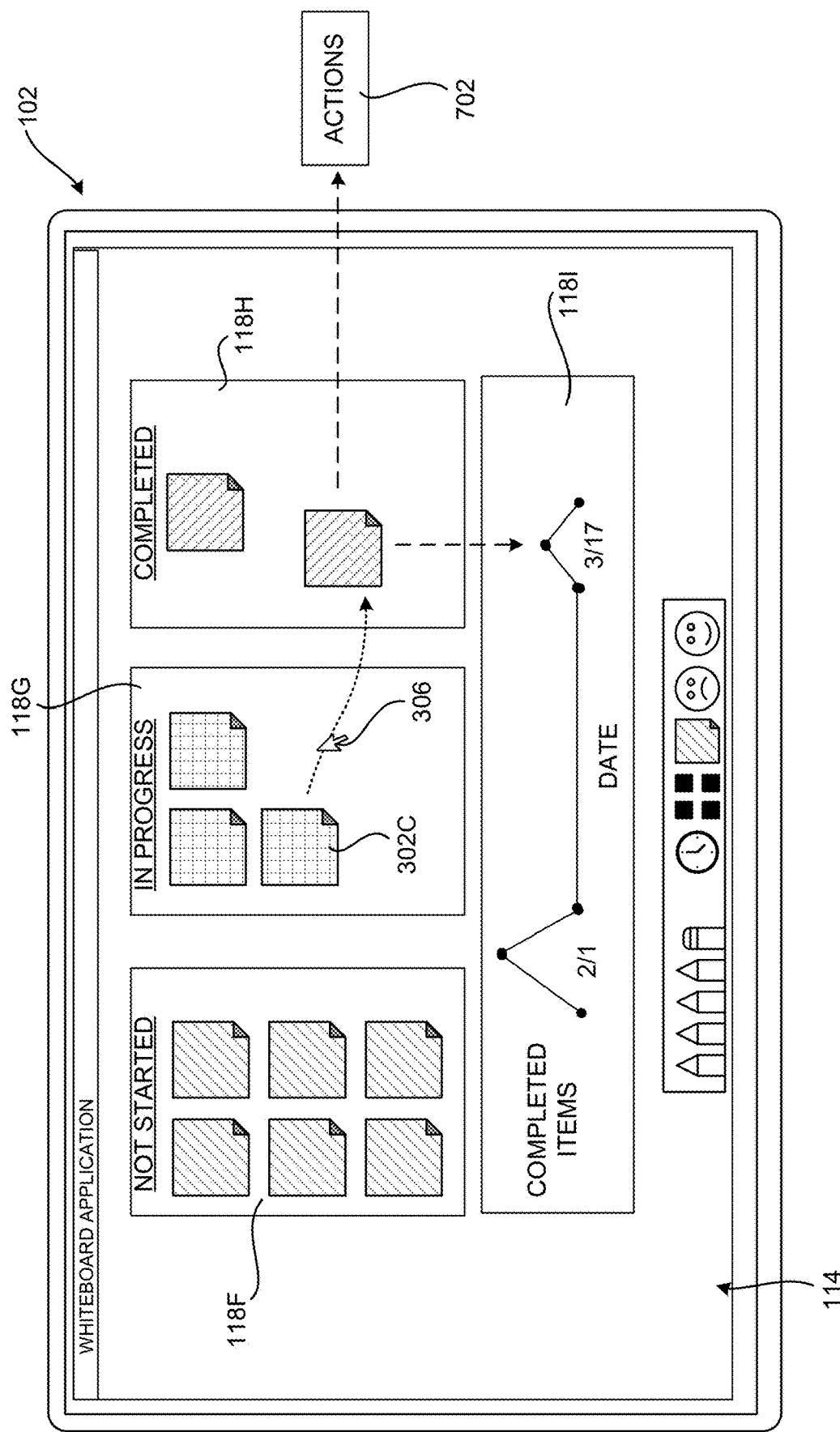

As shown in FIG. 7B, templates 116 and regions 118 can also be configured to initiate actions 702 based on changes to the logical representations 202 associated with objects 120. In the illustrated example, for instance, the logical representation 202 for a note object 302C has been modified as a result of the movement of the note object 302C from the region 118F to the region 118G. In particular, the logical representation 202 associated with the moved note object 302C has been modified to indicate that the note object 302C represents a completed task rather than an in-progress task.

In response to the modification of the logical representation 202 associated with the note object 302C, the template 116 or the region 118G has initiated an action 702. In this example, the action 702 is the transmission of an email message indicating completion of the task associated with the note object 302C. Other types of actions 702 can be initiated in response to the modification of logical representations 202 associated with other types of objects 302 in other configurations.

As also shown in FIG. 7B, different regions 118 can provide different views of the same logical representations 202. In the illustrated example, for instance, the region 118G presents objects 120 for completed tasks as note objects 302C. Simultaneously, the region 118I presents the objects 120 for completed tasks in a histogram shown the number of completed tasks as of their completion dates. The region 118I is updated as changes to the logical representations 202 of the objects 120 take place. For example, when the logical representation 202 for the note object 302C is changed as a result of the movement of the note object 302C from the region 118G to the region 118H, the region 118I updates its display to reflect completion of a task on 3/17.

FIGS. 8A-8E illustrate various aspects of another example template 116. In the example shown in FIGS. 8A-8E, the template 116 provides functionality for planning a meeting and keeping track of action items during the meeting. In order to provide this functionality, the template 116 includes three regions 118J, 118K, and 118L. The region 118J contains an object 120 representing a title for the meeting, the region 118K contains objects 120 representing agenda items for the meeting, and the region 118L contains objects 120 representing action items identified during the meeting.

Figure 8A:
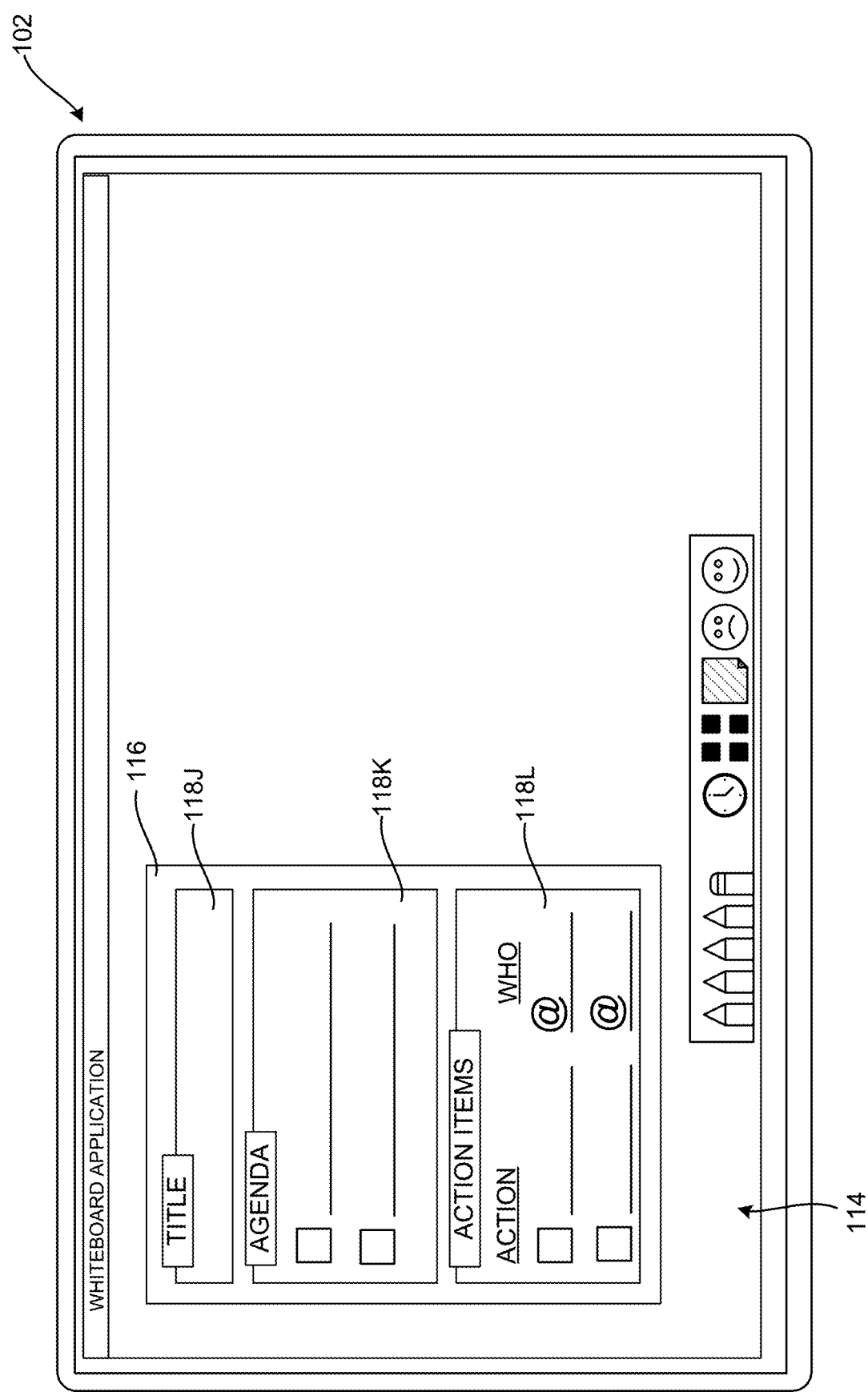
Figure 8B:
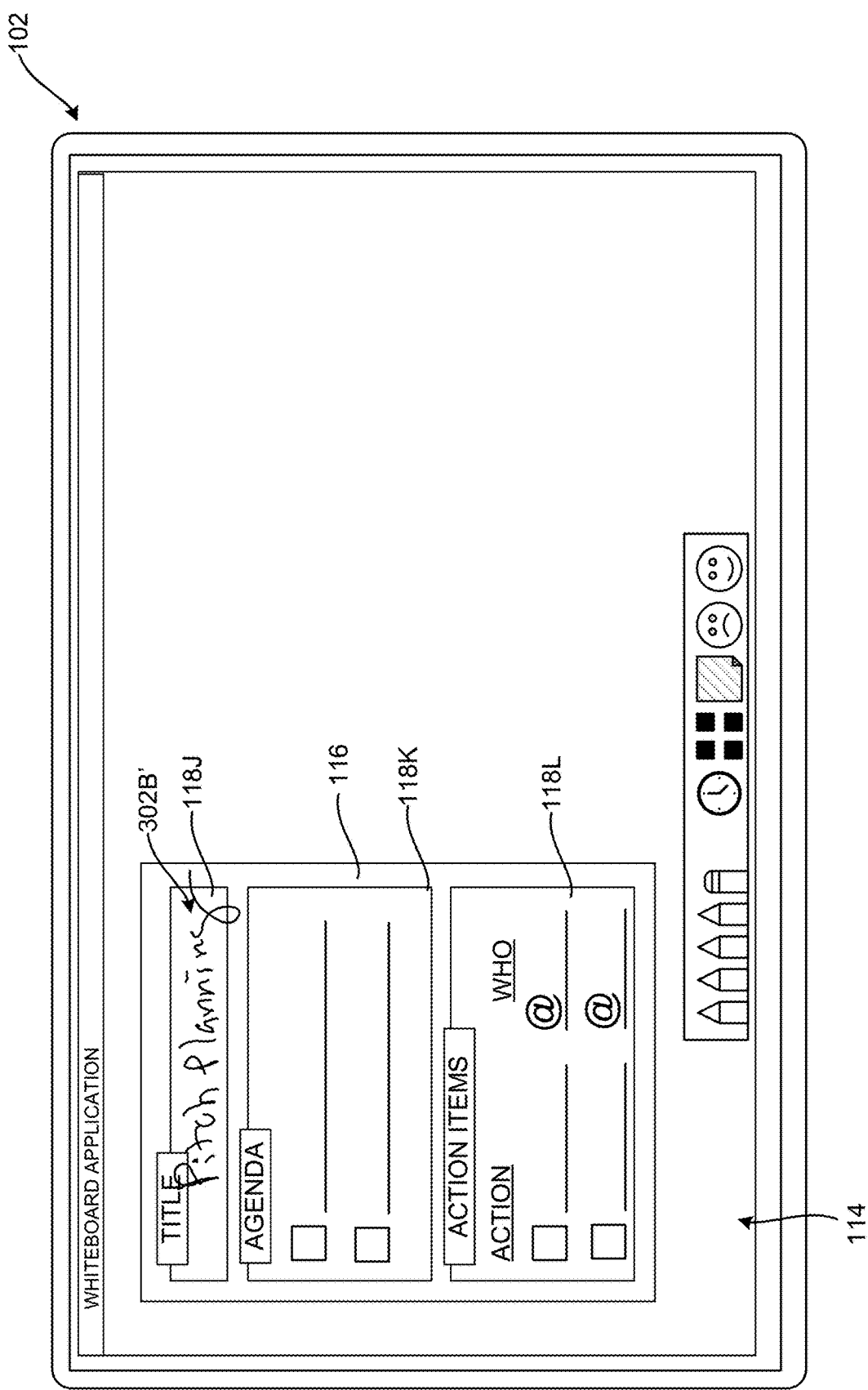

In the illustrated example, and as shown in FIG. 8B, a user has created a digital ink object 302B' identifying the title of the meeting ("Pitch Planning"). The region 118J stores data in the logical representation 202 associated with the digital ink object 302B' indicating that it is a meeting title. The digital ink object 302B' is converted to text and the logical representation for the digital ink object 302B' is again updated with the text title of the meeting.

Figure 8C:
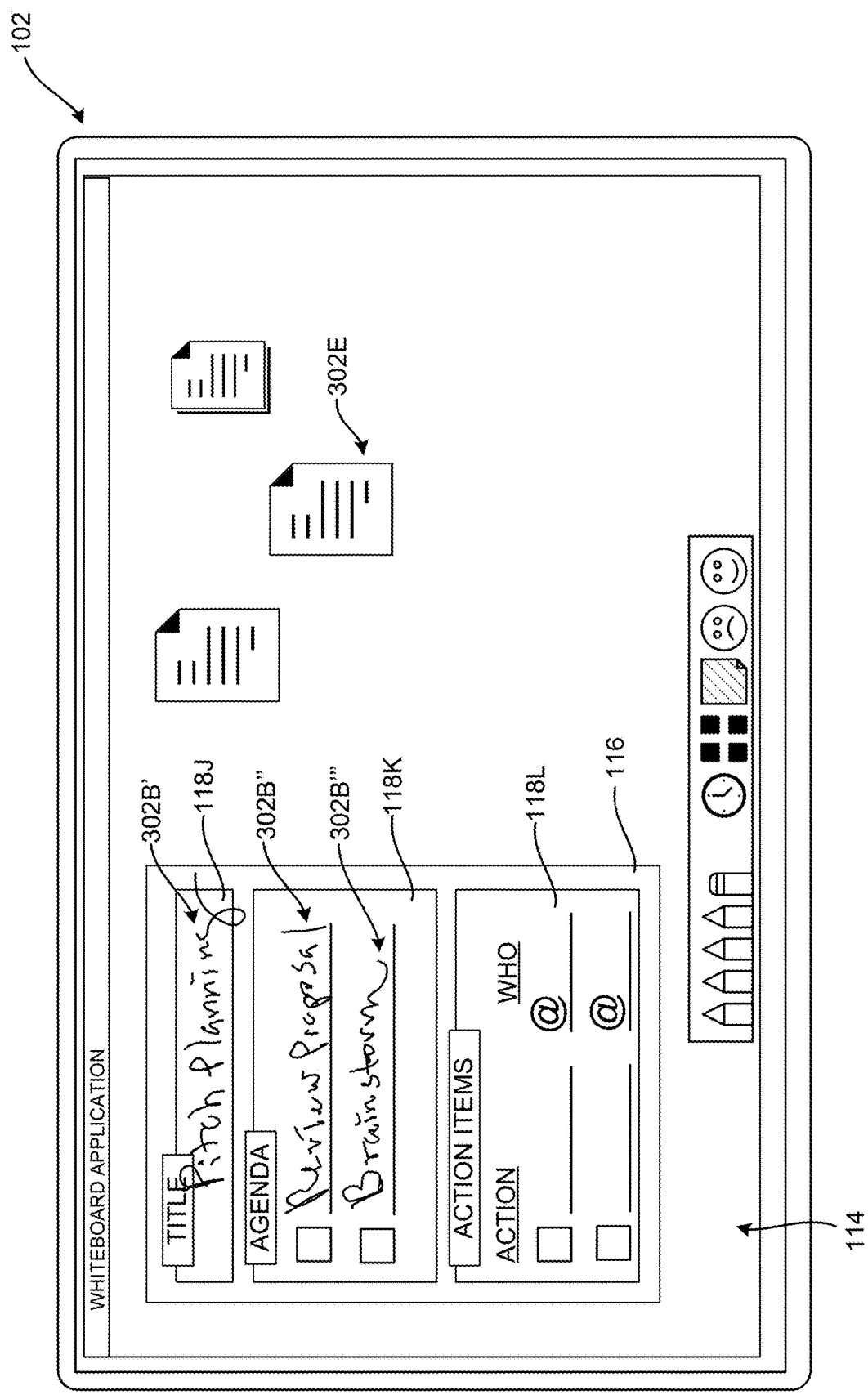

Continuing the example from FIGS. 8A and 8B, a user has created digital ink objects 302B" and 302B'" representing agenda items for the "Pitch Planning" meeting in FIG. 8C. In response thereto, the region 118K has added data to the logical representations 202 associated with these objects indicating that they are agenda items. Additionally, the digital ink is converted to text and the converted text is added to the logical representations 202 associated with the objects. In this way, the digital ink objects 302B" and 302B'" are annotated with semantic data indicating the type of item they are and the text associated with the item.

In FIG. 8D, the user has created a note object 302C in the manner described above. The user has also added text to the note object 302C identifying a user ("@Steve") and indicating an action item ("edit document") that the user is to complete. The logical representation of the note object 302C is then updated with this information.

Subsequently, the user has dragged the note object 302C onto the region 118L. In response thereto, the region 118L identifies the user and the action item and updates the logical representation 202 to indicate that the object is an action item indicating that @Steve is to edit a document. The region 118L can then render this data to show a corresponding action item 802 in the region 812L.

As described above, objects 120 in a template 116 or region 118 can be presented differently on a computing device 102A having a small display screen (e.g. a mobile phone) than when presented on a computing device 102 having a larger display screen (e.g. a tablet, laptop, or desktop computing device). The particular visual representation 206 selected for presenting a particular template 116 or region 118 might selected based upon other hardware or software capabilities of the computing device 102 upon which it is displayed.

Figure 8E:
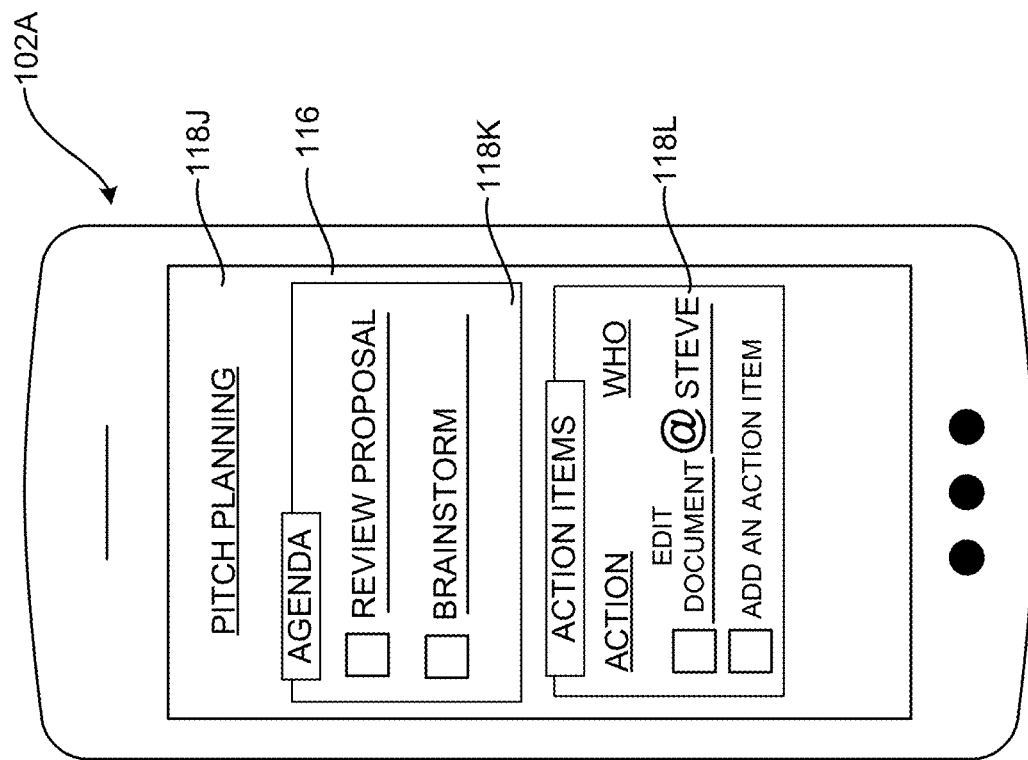

In the example shown in FIG. 8E, the template 116 from FIGS. 8A-8D has been presented on a mobile computing device 102A. In this example, the regions 118J-118L and the objects presented therein are rendered in a manner that is suitable for the smaller display screen of the mobile computing device 102A. For example, the digital ink objects 302B'-302B'" shown on a larger screen might be displayed as text on the screen of the mobile computing device 102A. Templates 116 and regions 118 can customize their display in other ways based upon other characteristics of a hardware device.

Figure 9A:
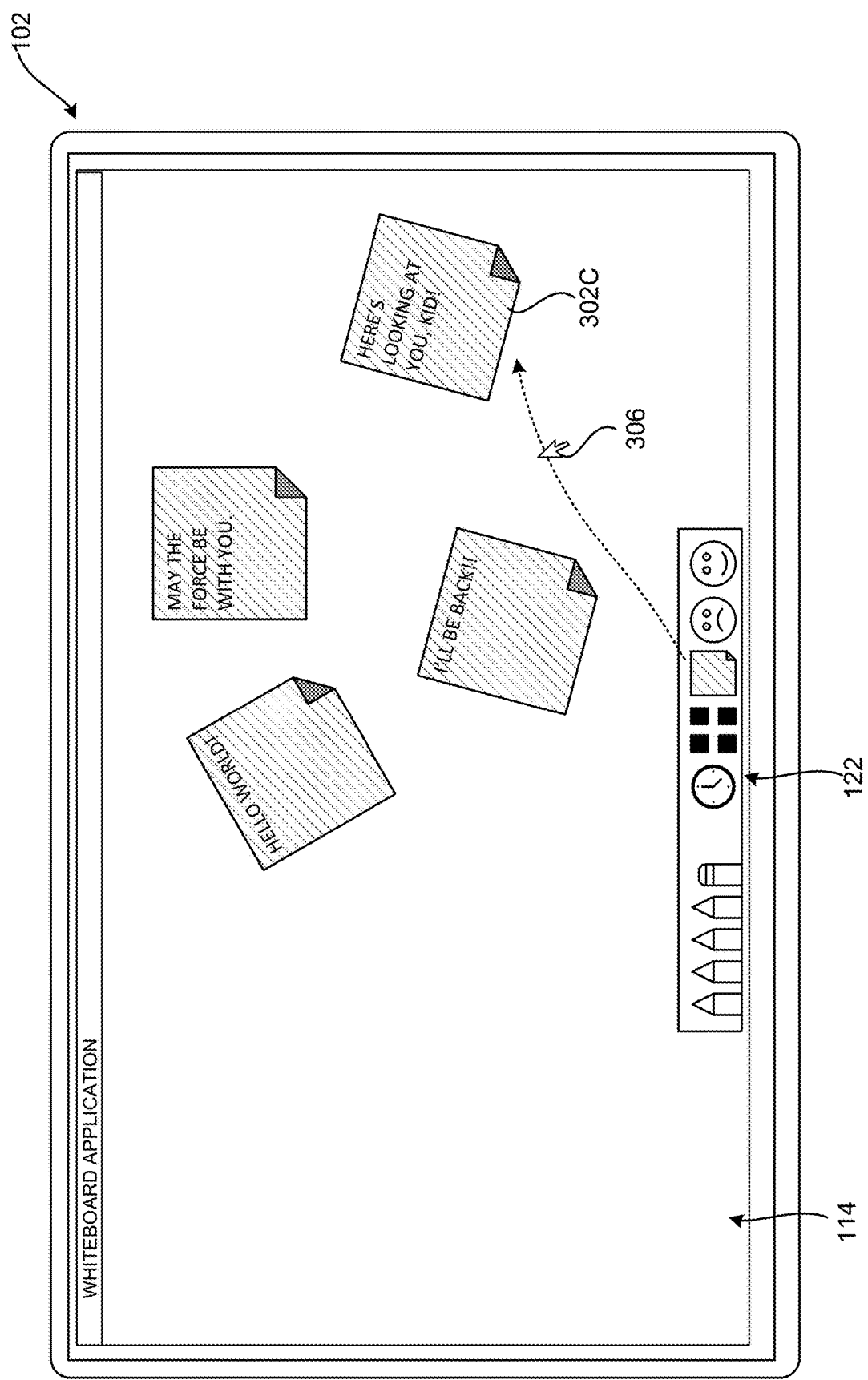

FIGS. 9A-9I are user interface diagrams showing additional aspects of the configuration and operation of the dynamic templates 116 and regions 118 disclosed herein. In the example illustrated in these FIGS., a user has created four note objects 302C on the canvas 114 in the manner described above. The user has also annotated each of the note objects 302C with text. The text is stored in the logical representations 202 associated with the note objects 302C. This is illustrated in FIG. 9A.

Figure 9B:
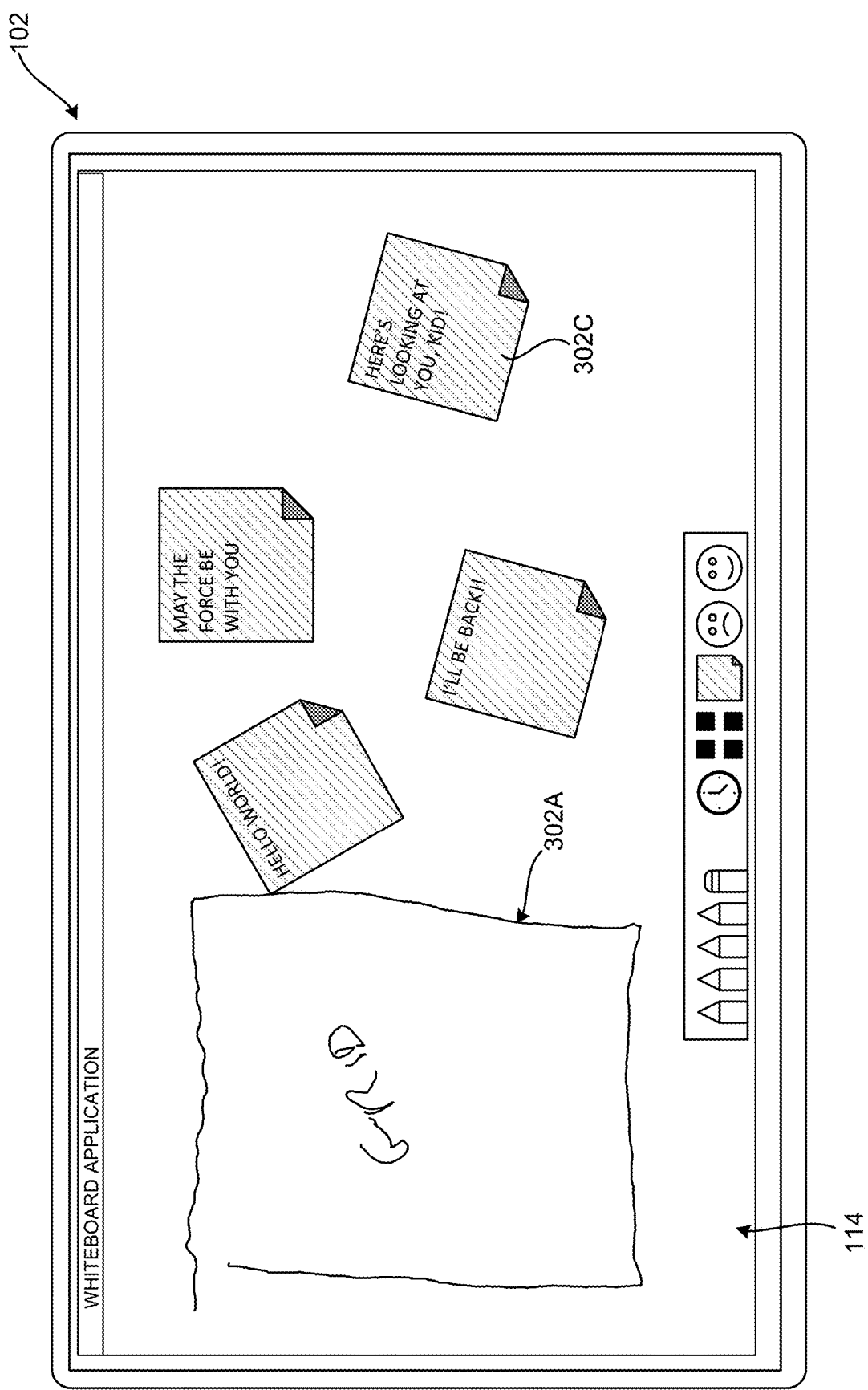

Continuing this example with regard to FIG. 9B, a user has drawn a digital ink object 302A in the approximate shape of a square and written the word "grid" inside the shape. In response thereto, the whiteboard application 104 has recognized the shape and the text and created a region 118M in place of the digital ink object 302A. This is illustrated in FIG. 9C. Various mechanisms known to those of skill in the art can be utilized to recognize shapes and text in this manner.

Figure 9D:
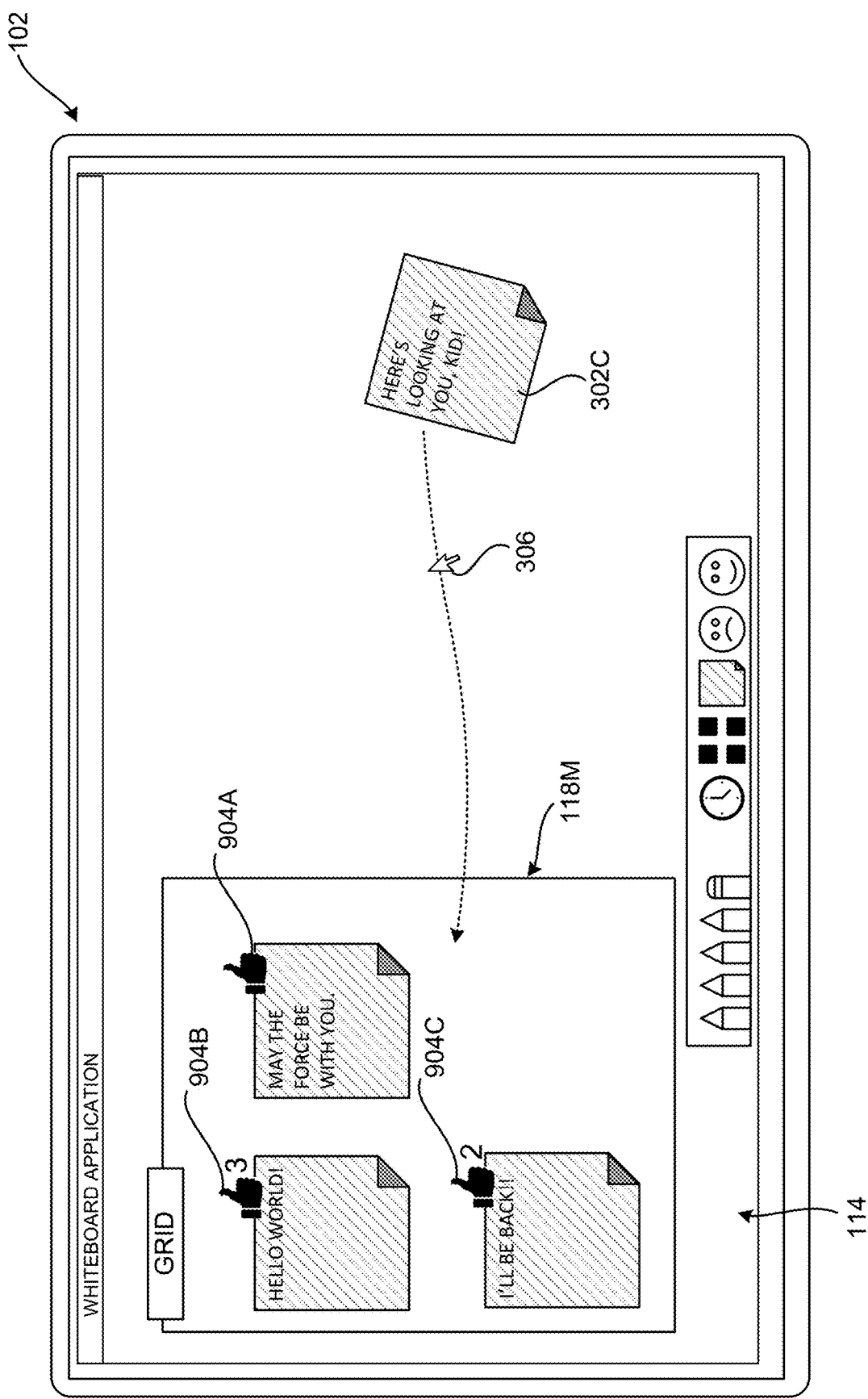
Figure 9E:
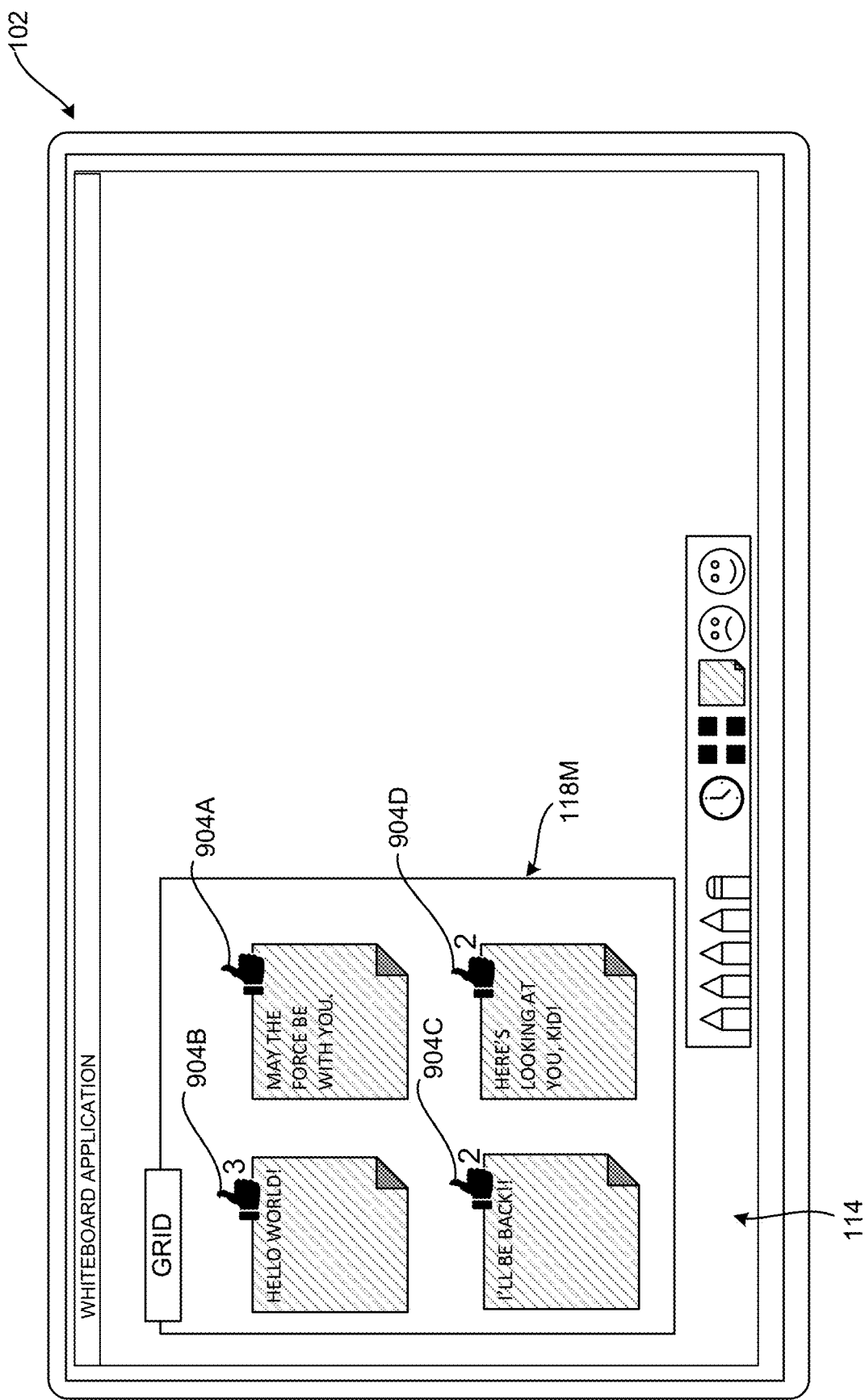
Figure 9F:
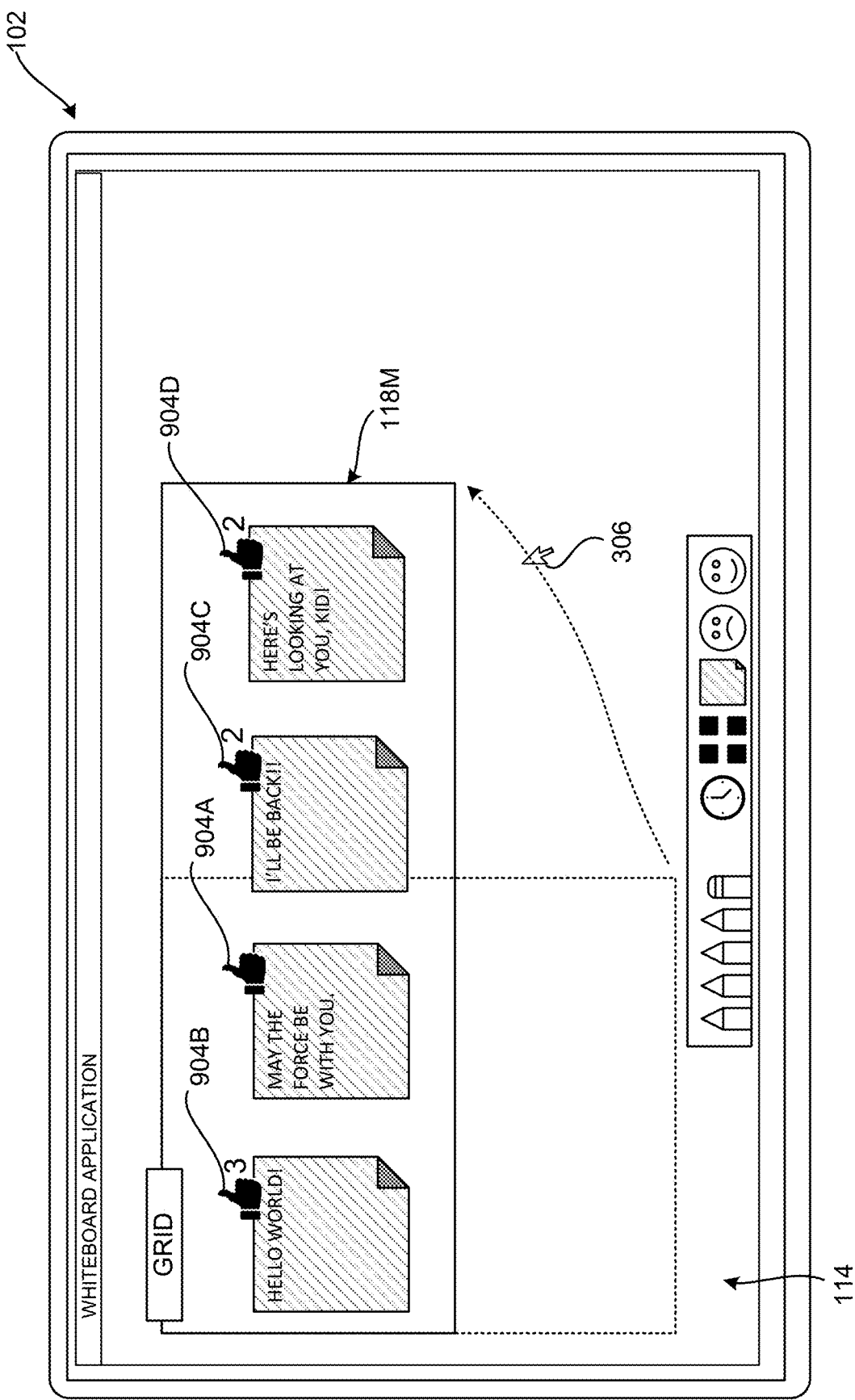

As shown in FIGS. 9D and 9E, the user has then dragged the note objects 302C to the region 118M. The user and potentially other users have also utilized tools from the toolbar 122 to cast votes for the content represented in the note objects 302C. In response thereto, data is also added to the logical representation 202 of each object 302A-302C indicating the number of votes. Additionally, the region 118M has presented icons 904A-904C adjacent to each note object 302C indicating the number of votes for that object.

As described briefly above, regions 118 can also be resized and will adjust their presentation of contained objects 120 when this occurs. In the example shown in FIG. 9F, for instance, a user has utilized the mouse cursor 306 to resize the region 118M. In response thereto, the region 118M has updated its presentation of the note objects 302C to accommodate the changed size of the region 118M. Templates 116 and regions 118 can also modify their size based upon the objects 120 contained therein. For example, a template 116 or region 118 might change its size to accommodate an object 120 moved into the template 116 or region 118 from another region or the canvas 114.

Figure 9G:
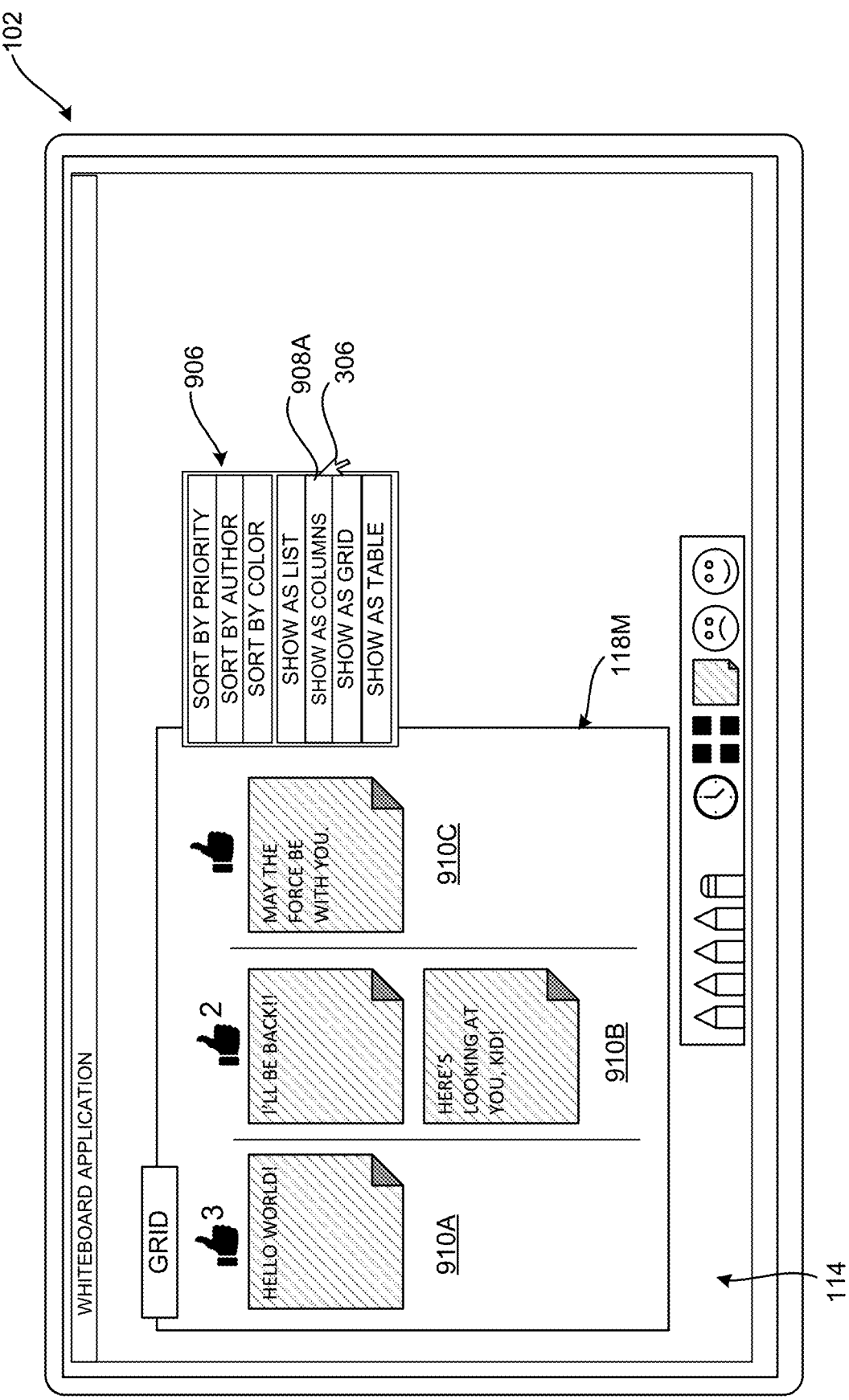
Figure 9H:
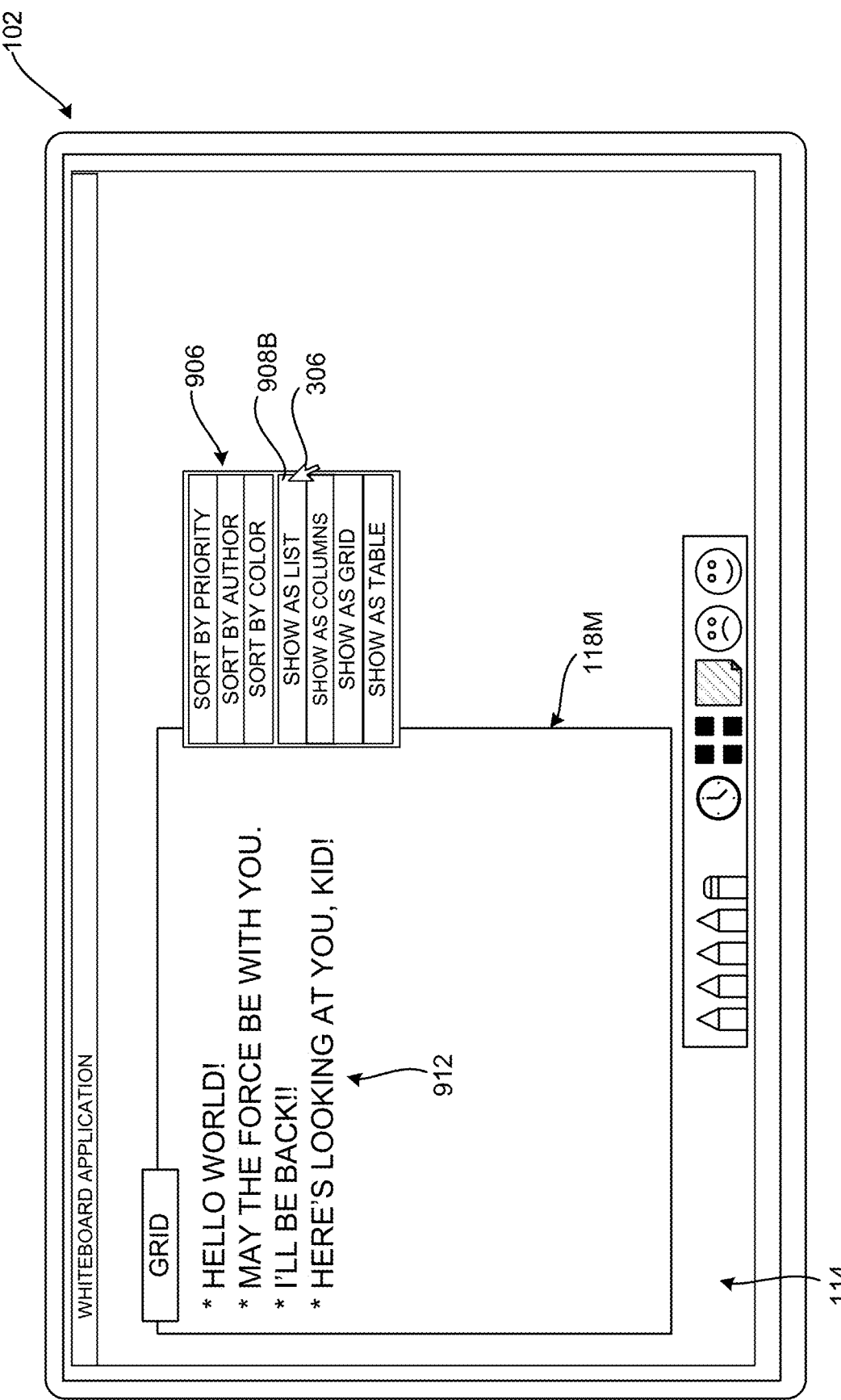
Figure 9I:
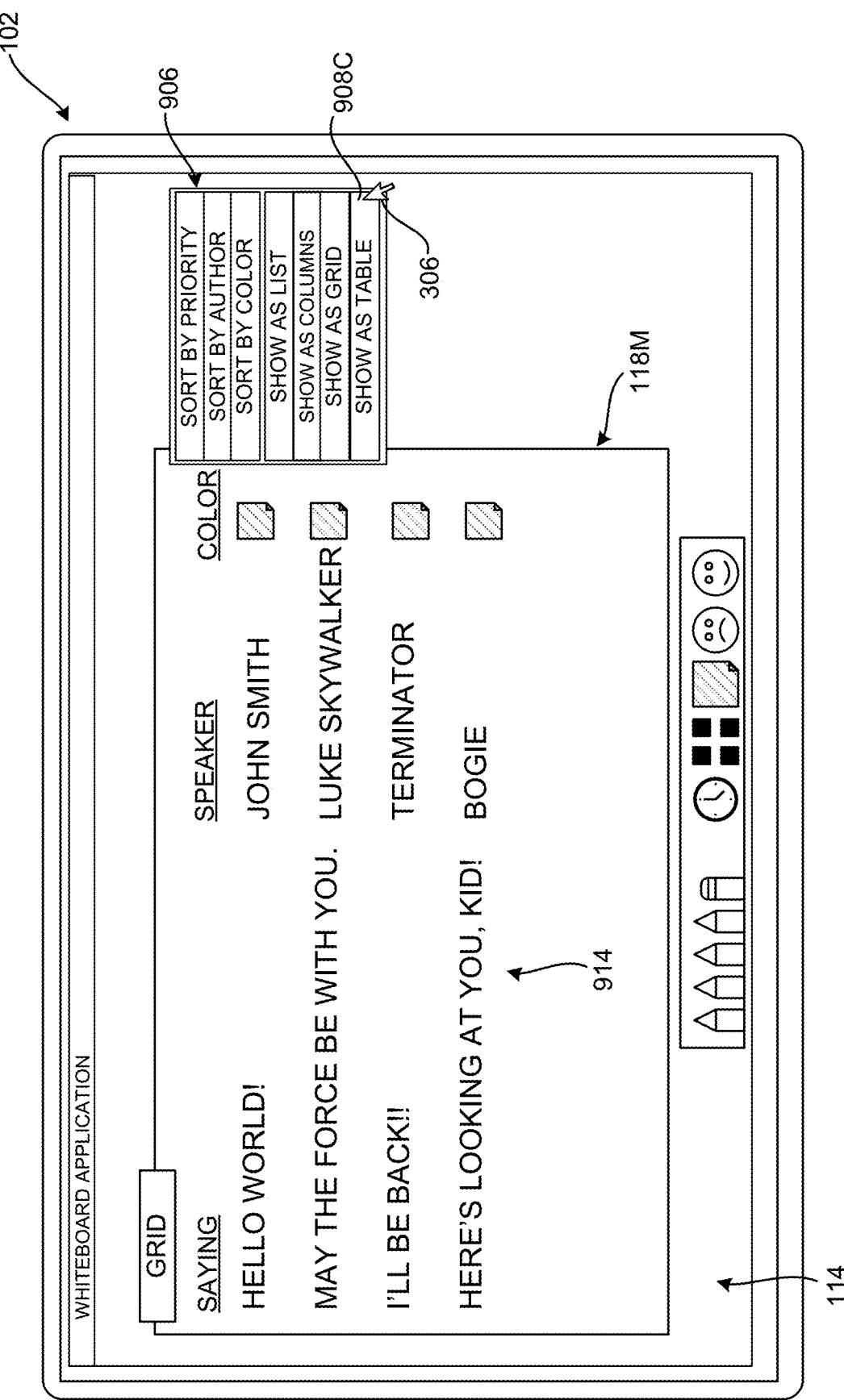

As shown in FIGS. 9G-9I, objects 120 contained within regions 118 can also be sorted, filtered, arranged, projected, and otherwise operated on based on their associated logical representations 202. Individual regions 118 can also present objects 120 contained therein in multiple different visual representations. For instance, a single region 118 might present objects 120 contained therein in a grid, list, table, or in another manner. The particular visual representation utilized by a template 116 or region 118 can be selected manually by a user or might be selected in other ways (e.g. based upon the capabilities of a computing device).

In the example shown in FIG. 9G, for instance, a menu 906 has been presented adjacent to the region 118M that includes items 908 for indicating how the objects 120 in the region 118M are to be sorted and/or presented. In the illustrated example, a user has selected the item 908A for displaying the objects 120 in the region 118M in columns.

In response to the selection of the item 908A, the region 118M has displayed the note objects 302C in columns. The note objects 302C in each column are selected based upon the number of votes the objects have received. As mentioned above, this data is stored in the logical representations 202 associated with the note objects 302C. As a result, the first column 910A includes a note object that has received one vote, the second column 910B includes two notes that have received two votes, and the third column 910C includes one note that has received only one vote.

In another example shown in FIG. 9H, a user has selected the item 908B for displaying the objects 120 in the region 118M as a list. In response thereto, the region 118M utilizes the data contained in the logical representations 202 associated with the contained objects to present a list 912 that includes the text of the objects. In a similar fashion, a user has selected the item 908C to cause the region 118M to present the objects 120 contained therein as a table. The table 914 includes various types of data from the logical representations 202 associated with the objects including the text, the speaker of the text, and a color associated with the objects 120. Other types of data from the logical representations 202 can be presented in a different manner in other embodiments.

In some configurations, objects 120 can be moved between regions 118 in response to conditions other than a user manually moving the objects 120 between regions 118. For example, and without limitation, a user might mark an object 120 representing a to-do item in a region 118 for presenting to-do items as having been completed. In response thereto, the template 116 or region 118 containing the to-do item might update the logical representation 202 for the associated object 120 to indicate that the item has been completed. Following the modification of the logical representation 202, the object 120 will no longer be displayed in the region 118 for to-do items and, instead, can be shown in a region 118 for presenting completed items.

Figure 10:
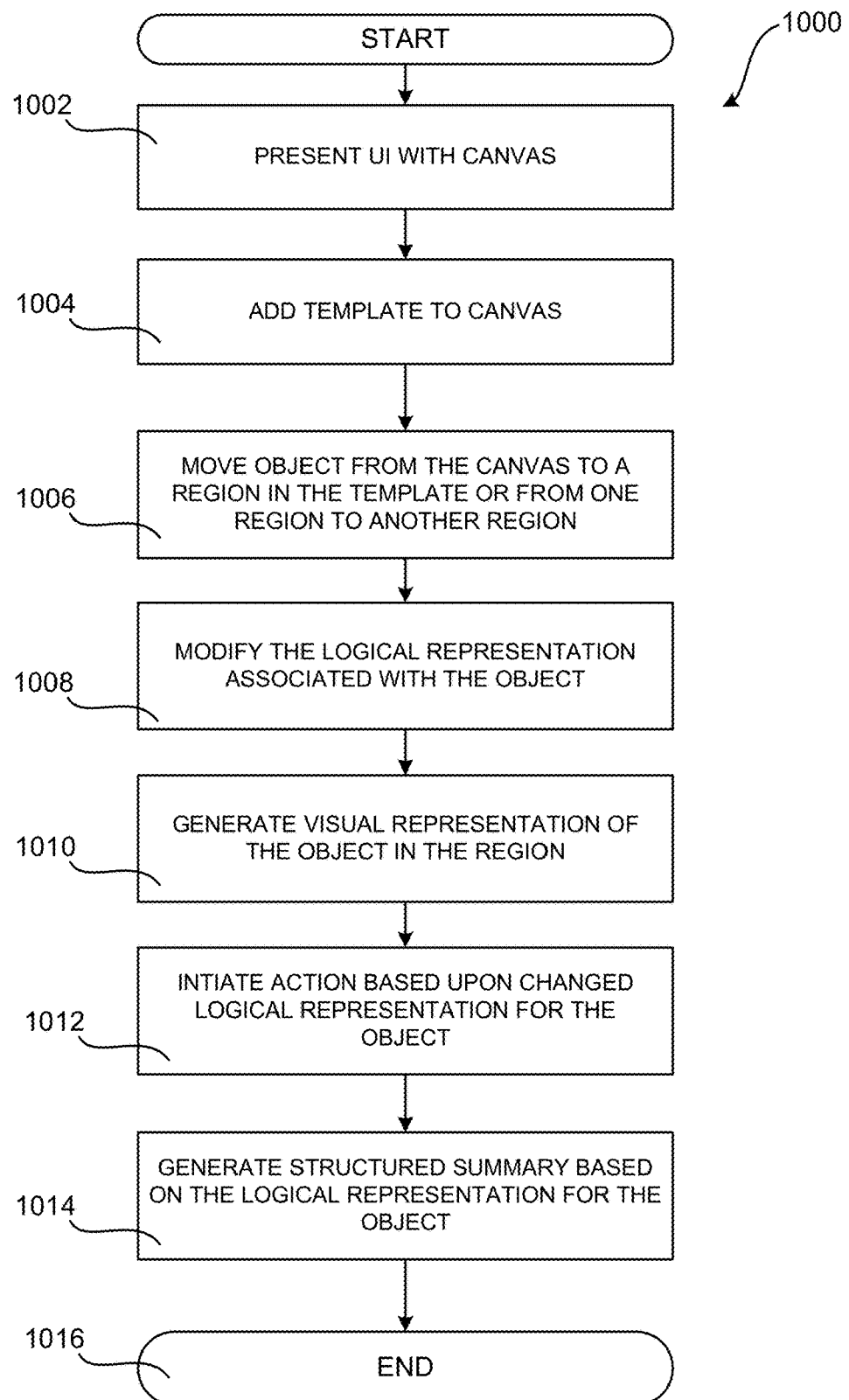
FIG. 10 is a flow diagram showing a routine that illustrates aspects of the operation of the computing device shown in FIG. 1 for providing dynamic whiteboard templates and regions.

FIG. 10 is a flow diagram showing a routine 1000 that illustrate aspects of the operation of the computing device 102 described above for providing dynamic whiteboard templates 116 and regions 118. It should be appreciated that the logical operations described herein with regard to FIG. 10, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 1000 begins at operation 1002, where the whiteboard application 104 can present a UI 106 that includes a canvas 114. The routine 1000 then proceeds from operation 1002 to operation 1004, where a user can add a template 116 to the canvas 114, such as the manner described above with regard to FIG. 5. The routine 1000 then proceeds from operation 1004 to operation 1006.

At operation 1006, a user can move an object 120 from the canvas 114 into a region 118 in the template 116 or from one region 118 in the template 116 to another region 118 in the template 116. In response thereto, the routine 1000 proceeds from operation 1006 to operation 1008, where the template 116 or the region 118 can modify the logical representation 202 associated with the moved object 120 in the manner described above. The destination region 118 can then generate a visual representation 206 of the object 120 at operation 1010 in the manner described above.

From operation 1010, the routine 1000 proceeds to operation 1012, where the template 116 or region 118 can initiate one or more actions 702 based upon the change to the logical representation 202. For example, a structured summary 604 might be generated (at operation 1014) and transmitted in an email message in the manner described above. From operation 1014, the routine 1000 proceeds to operation 1016, where it ends.

Figure 11:
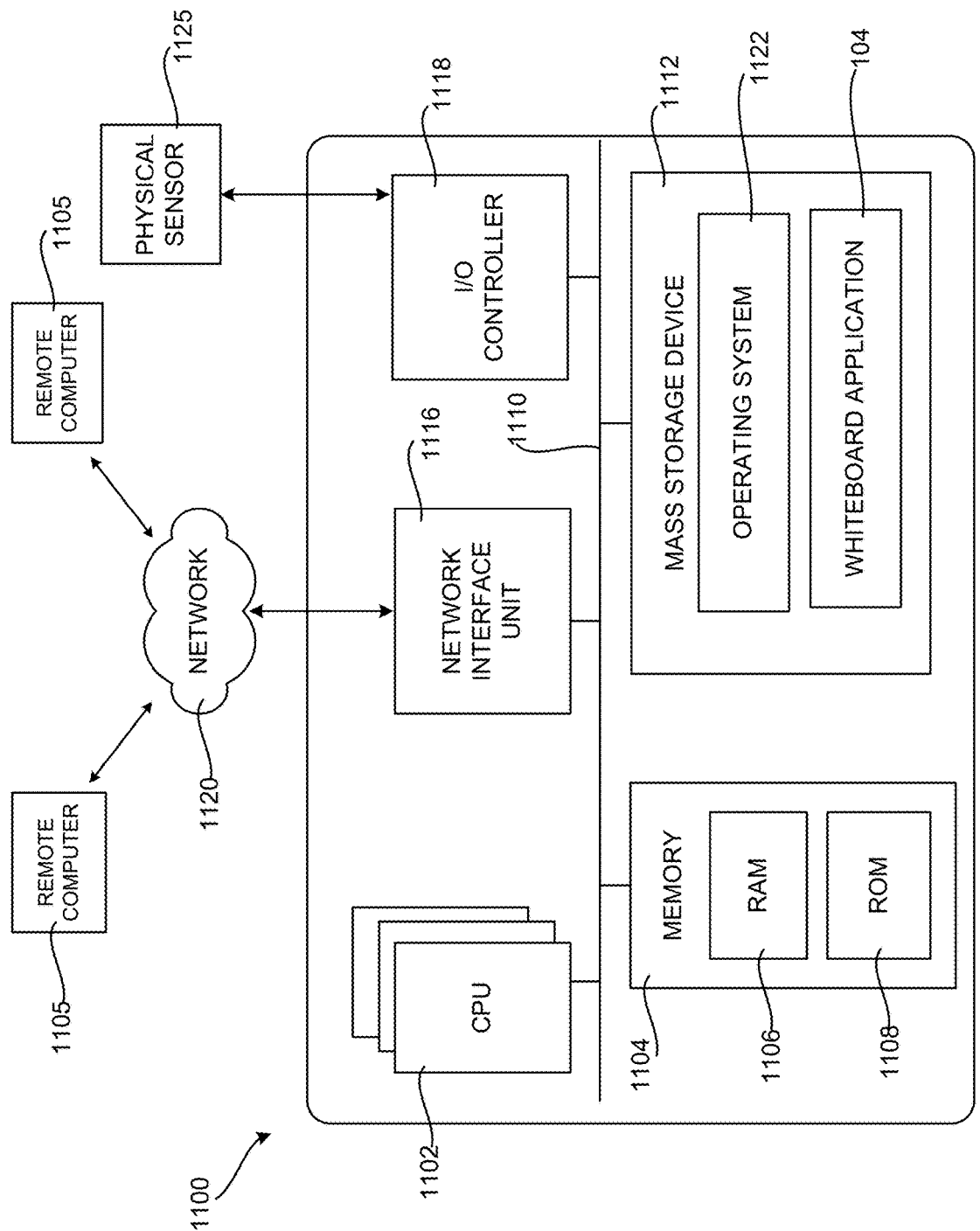
FIG. 11 is a computer architecture diagram showing an illustrative computer hardware and software architecture for a computing device that can implement aspects of the technologies presented herein.

FIG. 11 is a computer architecture diagram showing an illustrative computer hardware and software architecture for a computing device that can implement the various technologies presented herein. In particular, the architecture illustrated in FIG. 11 can be utilized to implement the computing device 102 described herein. The illustrated architecture can also be utilized to implement other types of computing systems.

The computer 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system ("BIOS" or "firmware") containing the basic routines that help to transfer information between elements within the computer 1100, such as during startup, can be stored in the ROM 1108. The computer 1100 further includes a mass storage device 1112 for storing an operating system 1122, application programs such as the whiteboard application 104, and other types of programs. The functionality described above for providing dynamic whiteboard templates and regions is implemented by one or more of these programs in various configurations. The mass storage device 1112 can also be configured to store other types of programs and data.

The mass storage device 1112 is connected to the CPU 1102 through a mass storage controller (not shown) connected to the bus 1110. The mass storage device 1112 and its associated computer readable media provide non-volatile storage for the computer 1100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1100. For purposes of the claims, the phrase "computer storage medium," and variations thereof, does not include waves or signals per se or communication media.

According to various configurations, the computer 1100 can operate in a networked environment using logical connections to remote computers through a network such as the network 1120. The computer 1100 can connect to the network 1120 through a network interface unit 1116 connected to the bus 1110. It should be appreciated that the network interface unit 1116 can also be utilized to connect to other types of networks and remote computer systems. The computer 1100 can also include an input/output controller 1118 for receiving and processing input from a number of other devices, including a keyboard, mouse, touch input, a digital pen 202, or a physical sensor such as a video camera.

The input/output controller 1118 can also, or alternately, provide output to one or more displays screens, such as the display device 104. As discussed above, the display device 104 might be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or a screen implementing another touchscreen technology. In some configurations, a touchscreen is incorporated on top of a display as a transparent layer.

It should be appreciated that the software components described herein, when loaded into the CPU 1102 and executed, can transform the CPU 1102 and the overall computer 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1100 in order to store and execute the software components presented herein. It also should be appreciated that the architecture shown in FIG. 11 for the computer 1100, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1100 might not include all of the components shown in FIG. 11, can include other components that are not explicitly shown in FIG. 11, or can utilize an architecture completely different than that shown in FIG. 11.

It should be appreciated that the computing architecture shown in FIG. 11 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computing device, comprising: a processor; and a memory storing instructions executable by the processor to: present a user interface (UI), the UI comprising a canvas configured for receiving heterogenous objects placed on the canvas in an unstructured manner, the objects having associated logical representations, and a first region on the canvas, the first region being configured to present the objects in a first visual representation or a second visual representation based upon the logical representations associated with the objects; receive user input moving an object of the objects into the first region; and responsive to receiving the user input for moving the object into the first region, modify a logical representation associated with the object, and display the object in the first region in the first visual representation based on the modified logical representation associated with the object.

Clause 2. The computing device of clause 1, wherein the memory stores further instructions executable by the processor to present the object in the first region in the second visual representation based on the modified logical representation associated with the object.

Clause 3. The computing device of clauses 1 or 2, wherein the first region is further configured to modify the first visual representation based upon one or more capabilities of the computing device.

Clause 4. The computing device of any of clauses 1-3, wherein the memory stores further instructions executable by the processor to: receive user input for moving an object from the canvas to the first region; and responsive to receiving the user input for moving the object from the canvas to the first region, modify the logical representation associated with the moved object.

Clause 5. The computing device of any of clauses 1-4, wherein the user interface further comprises a second region on the canvas, and wherein the memory stores further instructions executable by the processor to: receive user input moving the object from the first region to the second region; and responsive to receiving the user input moving the object from the first region to the second region, displaying the object in the second region in a third visual representation based on the logical representation associated with the object.

Clause 6. The computing device of any of clauses 1-5, wherein the second region is further configured to initiate an action responsive to the user input for moving the object from the first region to the second region.

Clause 7. The computing device of any of clauses 1-6, wherein the memory stores further instructions executable by the processor to modify a size of the second region responsive to movement of the object from the first region to the second region.

Clause 8. The computing device of any of clauses 1-7, wherein the first region is further configured to receive the logical representations from a data source and wherein the second region is configured to update the data source with a modified logical representation associated with the object responsive to the movement of the object from the first region to the second region.

Clause 9. A computer-implemented method, comprising: presenting a user interface (UI), the UI comprising a canvas having a first region, the first region configured to display an object in a first visual representation or a second visual representation based on a logical representation associated with the object, the logical representation being stored at a data source; displaying the object in the first visual representation in the first region based on the logical representation associated with the object; determining that the logical representation of the object has changed at the data source; and responsive to determining the logical representation has changed at the data source, displaying the object in the second visual representation in the first region based on the changed logical representation associated with the object.

Clause 10. The computer-implemented method of clause 9, further comprising: receiving user input moving a second object into the first region; and responsive to receiving the user input moving the second object into the first region, displaying the second object in the first visual representation in the first region based on a logical representation associated with the second object.

Clause 11. The computer-implemented method of clauses 9 or 10, wherein the first region is further configured to modify the first visual representation based upon one or more capabilities of the computing device.

Clause 12. The computer-implemented method of any of clauses 9-11, wherein the user interface further comprises a second region on the canvas, and wherein the method further comprises: receiving user input moving the object from the first region to the second region; and responsive to receiving the user input moving the object from the first region to the second region, displaying the object in the second region in a third visual representation based on the logical representation associated with the object.

Clause 13. The computer-implemented method of any of clauses 9-12, wherein the second region is further configured to initiate an action responsive to the user input for moving the object from the first region to the second region.

Clause 14. The computer-implemented method of any of clauses 9-13, wherein the first region is further configured to receive the logical representations from a data source and wherein the second region is configured to update the data source with a modified logical representation associated with the object responsive to the movement of the object from the first region to the second region.

Clause 15. A computer-readable storage medium having computer-executable instructions stored thereupon which, when executed by a processor, cause the processor to: display a user interface (UI), the UI comprising a canvas having a first region, the first region configured to display an object in a first visual representation or a second visual representation based on a logical representation associated with the object; receive user input moving an object into the first region; responsive to receiving the user input for moving the object into the first region, display the object in the first visual representation in the first region based on the logical representation associated with the object; receive user input requesting to display the object in the second visual representation; and responsive to receiving the user input requesting to display the object in the second visual representation, display the object in the second visual representation in the first region based on the logical representation associated with the object.

Clause 16. The computer-readable storage medium of clause 15, having further computer-executable instructions stored thereupon to modify the logical representation associated with the object when moving the object into the first region.

Clause 17. The computer-readable storage medium of clause 15 or 16, wherein the user interface further comprises a second region on the canvas, and wherein the computer-readable storage medium has further computer-executable instructions stored thereupon to: receive user input moving the object from the first region to the second region; and responsive to receiving the user input moving the object from the first region to the second region, display the object in the second region in a third visual representation based on the logical representation associated with the object.

Clause 18. The computer-readable storage medium of any of clauses 15-17, wherein the second region is further configured to initiate an action responsive to the user input for moving the object from the first region to the second region.

Clause 19. The computer-readable storage medium of clauses 15-18, wherein the first region is further configured to receive the logical representations from a data source.

Clause 20. The computer-readable storage medium of clauses 15-19, wherein the second region is configured to update the data source with a modified logical representation associated with the object responsive to the movement of the object from the first region to the second region.

Based on the foregoing, it should be appreciated that technologies for providing dynamic whiteboard templates and regions have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computing device, comprising:
   a processor; and
   a memory storing instructions executable by the processor to:
   present a user interface (UI), the UI comprising:
   a canvas, having a first graphical region and a second graphical region configured for receiving heterogenous objects placed on the canvas in an unstructured manner, the objects having associated logical representations, and
   the first graphical region, wherein the first graphical region is configured to receive the logical representations from a data source and present the objects using a visual representation or a second visual representation based upon the logical representations associated with the objects, wherein the logical representations define properties for the objects;
   receive a user input graphically moving an object of the objects from the first graphical region to the second graphical region of the canvas; and
   responsive to receiving the user input for graphically moving the object from the first graphical region to the second graphical region of the canvas, modify the logical representation associated with the object, update the data source with the modified logical representation and display the object in the second graphical region using a third visual representation based on the modified logical representation associated with the object.

2. The computing device of claim 1, wherein the memory stores further instructions executable by the processor to present the object in the first region in the second visual representation based on the modified logical representation associated with the object.

3. The computing device of claim 1, wherein the first region is further configured to modify the first visual representation based upon one or more capabilities of the computing device.

4. The computing device of claim 1, wherein the memory stores further instructions executable by the processor to: receive user input for moving an object from the canvas to the first region; and responsive to receiving the user input for moving the object from the canvas to the first region, modify the logical representation associated with the moved object.

5. The computing device of claim 1, wherein the properties of the logical representation comprise at least one of, a type of object, a creator of the objects, or a creation date of the objects.

6. The computing device of claim 1, wherein the properties of the logical representation comprise a data structure defining modifications to the visual representation of the object in the first region.

7. The computing device of claim 1, wherein the first region is further configured to sort, filter, arrange, or otherwise operate on the objects based upon the associated logical representations.

8. The computing device of claim 1, wherein the canvas comprises a plurality of regions wherein the individual regions are configured to modify one or more properties of the logical representation responsive to a user input for moving the object into a region of the individual regions.

9. The computing device of claim 1, wherein the user interface further comprises a third graphical region on the canvas, and wherein the memory stores further instructions executable by the processor to:
   receive user input moving the object from the second region to the third region; and
   responsive to receiving the user input moving the object from the second region to the third region, displaying the object in the second region using a second modified visual representation based on the logical representation associated with the object.

10. The computing device of claim 1, wherein the memory stores further instructions executable by the processor to:
    receive user input resizing a graphical region on the canvas to generate a changed size of the graphical region; and
    responsive to receiving the user input resizing the graphical region, modify an arrangement of one or more visual representations of one or more objects within the graphical region to accommodate a new size or a new shape of the graphical region, the modification of the arrangement of the one or more visual representations maintaining an order of the one or more visual representations while moving the one or more visual representations to remain in the new size or the new shape of the graphical region.

11. A computer-implemented method, comprising:
    presenting a user interface (UI), the UI comprising a canvas having a first graphical region and a second graphical region configured for receiving heterogenous objects placed on the canvas in an unstructured manner, the objects having associated logical representations, and
    the first graphical region configured to display an object in a first visual representation or a second visual representation, based on a logical representation associated with the object, wherein the logical representations define properties for the object, the logical representation being stored at a data source and wherein the first graphical region is configured to receive the logical representations from the data source;

displaying the object in the first visual representation in the first graphical region based on the logical representation associated with the object;

determining that the logical representation of the object has changed at the data source in response to a user input for graphically moving the object into the first graphical region from the second graphical region of the canvas; and responsive to determining the logical representation has changed at the data source, displaying the object in a third visual representation in the first graphical region based on the changed logical representation associated with the object.

12. The computer-implemented method of claim 11, further comprising: receiving user input moving a second object into the first region; and responsive to receiving the user input moving the second object into the first region, displaying the second object in the first visual representation in the first region based on a logical representation associated with the second object.

13. The computer-implemented method of claim 11, wherein the first region is further configured to modify the first visual representation based upon one or more capabilities of the computing device.

14. The method of claim 11, wherein the user interface further comprises a third graphical region on the canvas, and wherein the memory stores further instructions executable by the processor to:

receive user input moving the object from the second region to the third region; and responsive to receiving the user input moving the object from the second region to the third region, displaying the object in the second region using a second modified visual representation based on the logical representation associated with the object.

15. The method of claim 11 further comprising:

receiving user input resizing a graphical region on the canvas to generate a changed size of the graphical region; and responsive to receiving the user input resizing the graphical region, modifying an arrangement of one or more visual representations of one or more objects within the graphical region to accommodate a new size or a new shape of the graphical region, the modification of the arrangement of the one or more visual representations maintaining an order of the one or more visual representations while moving the one or more visual representations to remain in the new size or the new shape of the graphical region.

16. A computer-readable storage medium having computer-executable instructions stored thereupon which, when executed by a processor, cause the processor to:

display a user interface (UI), the UI comprising a canvas having a first graphical region, and a second graphical region, the first graphical region configured to display an object in a first visual representation or a second visual representation based on a logical representation associated with the object, wherein the logical representations define properties for the object and wherein the first graphical region is configured to receive the logical representation from a data source;

receive a user input graphically moving an object from the first graphical region to the second graphical region of the canvas;

responsive to receiving the user input for graphically moving the object from the first graphical region to the second graphical region of the canvas, display the object in the first visual representation in the first region based on the logical representation associated with the object;

receive user input requesting to display the object in a second visual representation; and responsive to receiving the user input requesting to display the object in the second visual representation, update the data source with a modified logical representation and display the object in a second visual representation in the second graphical region using a modified visual representation based on the modified logical representation associated with the object.

17. The computer-readable storage medium of claim 16, having further computer-executable instructions stored thereupon to modify the logical representation associated with the object when moving the object into the first region.

18. The computer-readable storage medium of claim 16, wherein the user interface further comprises a second region on the canvas, and wherein the computer-readable storage medium has further computer-executable instructions stored thereupon to:

receive user input moving the object from the first region to the second region; and responsive to receiving the user input moving the object from the first region to the second region, display the object in the second region in a third visual representation based on the logical representation associated with the object.

19. The computer-readable storage medium of claim 16, wherein the user interface further comprises a third graphical region on the canvas, and wherein the memory stores further instructions executable by the processor to:

receive user input moving the object from the second region to the third region; and responsive to receiving the user input moving the object from the second region to the third region, displaying the object in the second region using a second modified visual representation based on the logical representation associated with the object.

20. The computer-readable storage medium of claim 16, wherein the memory stores further instructions that, when executed by a processor, cause the processor to:

receive user input resizing a graphical region on the canvas to generate a changed size of the graphical region; and responsive to receiving the user input resizing the graphical region, modify an arrangement of one or more visual representations of one or more objects within the graphical region to accommodate a new size or a new shape of the graphical region, the modification of the arrangement of the one or more visual representations maintaining an order of the one or more visual representations while moving the one or more visual representations to remain in the new size or the new shape of the graphical region.

* * * * *